(12) United States Patent
Bell et al.

(10) Patent No.: US 12,401,650 B1
(45) Date of Patent: *Aug. 26, 2025

(54) SECURE DIGITAL AUTHORIZATION BASED ON IDENTITY ELEMENTS OF USERS AND/OR LINKAGE DEFINITIONS IDENTIFYING SHARED DIGITAL ASSETS

(71) Applicant: Wells Fargo Bank, N.A., San Francisco, CA (US)

(72) Inventors: Thomas E. Bell, San Francisco, CA (US); Peter Bordow, Fountain Hills, AZ (US); Julio Jiron, San Bruno, CA (US); Akhlaq M. Khan, San Francisco, CA (US); Volkmar Scharf-Katz, San Francisco, CA (US); Jeff J. Stapleton, Arlington, TX (US); Richard Orlando Toohey, San Francisco, CA (US); Ramesh Yarlagadda, San Francisco, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 40 days.

This patent is subject to a terminal disclaimer.

(21) Appl. No.: 17/903,835

(22) Filed: Sep. 6, 2022

Related U.S. Application Data

(63) Continuation of application No. 17/901,550, filed on Sep. 1, 2022, now Pat. No. 12,248,545.

(51) Int. Cl.
  *H04L 9/40* (2022.01)
  *G06F 21/62* (2013.01)
(52) U.S. Cl.
  CPC ........ *H04L 63/102* (2013.01); *G06F 21/6218* (2013.01); *H04L 63/0853* (2013.01)

(58) Field of Classification Search
  CPC ............... H04L 63/102; H04L 63/0853; G06F 21/6218

(Continued)

(56) References Cited

U.S. PATENT DOCUMENTS 7,133,846 B1  11/2006  Ginter et al.
7,673,797 B2  3/2010  Edwards (Continued)

FOREIGN PATENT DOCUMENTS

CA          2478548 C      3/2014
DE   10 2021 108 925 A1   10/2022

(Continued)

OTHER PUBLICATIONS

Jain, et al., A Blockchain-Based distributed network for Secure Credit Scoring, 2019 5th International Conference on Signal Processing, Computing and Control (ISPCC), 306-12, Oct. 2019; ISBN-13: 978-1-7281-3988-3.

(Continued)

*Primary Examiner* — Bryan F Wright
(74) *Attorney, Agent, or Firm* — Foley & Lardner LLP

(57) ABSTRACT

Disclosed are example methods, systems, and devices that allow for secure digital authorization via generated datasets. The techniques include receiving a first dataset of a first user and a second dataset of a second user and generating a first set of identity elements and a second set of identity elements based on the first dataset and the second dataset, respectively. A linkage definition can be generated based on the first and second datasets, which can be associated with a set of activation elements. The techniques include determining that a set of inputs satisfy one or more of the set of activation elements and, in response, generating a set of security access tokens based on the linkage condition. The security access (Continued)

tokens can be transmitted to a computing device upon analyzing and verifying biometric data received from that computing device.

20 Claims, 7 Drawing Sheets

(58) Field of Classification Search
USPC .......................................................... 726/4
See application file for complete search history.

(56) References Cited

U.S. PATENT DOCUMENTS

| | | |
|---|---|---|
| 8,234,387 B2 | 7/2012 | Bradley et al. |
| 8,446,275 B2 | 5/2013 | Utter, II |
| 8,731,977 B1 | 5/2014 | Hardin et al. |
| 8,756,153 B1 | 6/2014 | Rolf |
| 8,831,972 B2 | 9/2014 | Angell et al. |
| 8,965,803 B2 | 2/2015 | Jung et al. |
| 9,087,058 B2 | 7/2015 | Neven et al. |
| 9,094,388 B2 | 7/2015 | Tkachev |
| 9,177,257 B2 | 11/2015 | Kozloski et al. |
| 9,443,298 B2 | 9/2016 | Ross et al. |
| 9,519,783 B2 | 12/2016 | Pruthi et al. |
| 9,558,397 B2 | 1/2017 | Liu et al. |
| 9,734,290 B2 | 8/2017 | Srinivas et al. |
| 9,864,992 B1 | 1/2018 | Robinson et al. |
| 10,024,684 B2 | 7/2018 | Wang |
| 10,044,700 B2 | 8/2018 | Gresham et al. |
| 10,075,445 B2 | 9/2018 | Chen et al. |
| 10,102,491 B2 | 10/2018 | Connolly et al. |
| 10,110,608 B2 | 10/2018 | Dureau |
| 10,127,378 B2 | 11/2018 | Toth |
| 10,142,362 B2 | 11/2018 | Weith et al. |
| 10,181,032 B1 | 1/2019 | Sadaghiani et al. |
| 10,210,527 B2 | 2/2019 | Radocchia |
| 10,313,336 B2 | 6/2019 | Giobbi |
| 10,362,027 B2 | 7/2019 | Eramian et al. |
| 10,387,695 B2 | 8/2019 | Engels et al. |
| 10,505,965 B2 | 12/2019 | Moyle et al. |
| 10,552,596 B2 | 2/2020 | Wang et al. |
| 10,572,778 B1 | 2/2020 | Robinson et al. |
| 10,614,302 B2 | 4/2020 | Withrow |
| 10,664,581 B2 | 5/2020 | Hou et al. |
| 10,740,767 B2 | 8/2020 | Withrow |
| 10,757,097 B2 | 8/2020 | Yocam et al. |
| 10,778,676 B1 | 9/2020 | Griffin et al. |
| 10,834,084 B2 | 11/2020 | Ouellette et al. |
| 10,855,679 B2 | 12/2020 | Rajakumar |
| 10,938,828 B1 | 3/2021 | Badawy et al. |
| 10,943,003 B2 | 3/2021 | Bingham et al. |
| 10,963,670 B2 | 3/2021 | Ross et al. |
| 10,977,353 B2 | 4/2021 | Bender et al. |
| 11,044,267 B2 | 6/2021 | Jakobsson et al. |
| 11,048,794 B1 | 6/2021 | Bordow |
| 11,048,894 B2 | 6/2021 | Feldman |
| 11,055,390 B1 | 7/2021 | Kragh |
| 11,057,366 B2 | 7/2021 | Avetisov et al. |
| 11,068,909 B1 | 7/2021 | Land et al. |
| 11,075,904 B2 | 7/2021 | Jha et al. |
| 11,089,014 B2 | 8/2021 | Buscemi |
| 11,093,789 B2 | 8/2021 | Wang et al. |
| 11,127,092 B2 | 9/2021 | Kurian |
| 11,128,467 B2 | 9/2021 | Chapman et al. |
| 11,151,550 B2 | 10/2021 | Prabhu et al. |
| 11,157,907 B1 | 10/2021 | Kumar |
| 11,163,931 B2 | 11/2021 | Ricci |
| 11,200,306 B1 | 12/2021 | Singh |
| 11,205,011 B2 | 12/2021 | Jakobsson et al. |
| 11,223,646 B2 | 1/2022 | Cunningham et al. |
| 11,290,448 B1 | 3/2022 | Bordow |
| 11,327,992 B1 | 5/2022 | Batsakis et al. |
| 11,451,532 B2 | 9/2022 | Arif Khan et al. |
| 11,514,155 B1 | 11/2022 | Bordow |
| 11,522,867 B2 | 12/2022 | Han et al. |
| 11,669,611 B1 | 6/2023 | Bordow |
| 2003/0086341 A1 | 5/2003 | Wells et al. |
| 2006/0129478 A1 | 6/2006 | Rees |
| 2007/0078908 A1 | 4/2007 | Rohatgi et al. |
| 2008/0022370 A1 | 1/2008 | Beedubail et al. |
| 2008/0120302 A1 | 5/2008 | Thompson |
| 2009/0089107 A1 | 4/2009 | Angell et al. |
| 2009/0089205 A1 | 4/2009 | Bayne |
| 2012/0237908 A1 | 9/2012 | Fitzgerald et al. |
| 2015/0112732 A1 | 4/2015 | Trakru et al. |
| 2015/0220999 A1 | 8/2015 | Thornton et al. |
| 2015/0317728 A1 | 11/2015 | Nguyen |
| 2016/0050557 A1 | 2/2016 | Park et al. |
| 2016/0162882 A1 | 6/2016 | Mcclung, III |
| 2016/0224773 A1 | 8/2016 | Ramaci |
| 2016/0335629 A1 | 11/2016 | Scott |
| 2017/0012992 A1 | 1/2017 | Doctor et al. |
| 2017/0063831 A1 | 3/2017 | Arnold et al. |
| 2017/0063946 A1 | 3/2017 | Quan et al. |
| 2017/0111351 A1 | 4/2017 | Grajek et al. |
| 2017/0230351 A1 | 8/2017 | Hallenborg |
| 2017/0236037 A1 | 8/2017 | Rhoads et al. |
| 2018/0205546 A1 | 7/2018 | Haque et al. |
| 2019/0095916 A1 | 3/2019 | Jackson |
| 2019/0149539 A1 | 5/2019 | Scruby |
| 2019/0163889 A1 | 5/2019 | Bouse |
| 2019/0205939 A1 | 7/2019 | Lal et al. |
| 2019/0334724 A1 | 10/2019 | Anton et al. |
| 2020/0211031 A1 | 7/2020 | Patil |
| 2020/0266985 A1 | 8/2020 | Covaci et al. |
| 2020/0311678 A1 | 10/2020 | Fletcher et al. |
| 2020/0374311 A1 | 11/2020 | Madhu et al. |
| 2020/0380598 A1 | 12/2020 | Spector et al. |
| 2021/0027061 A1 | 1/2021 | Xu et al. |
| 2021/0089637 A1 | 3/2021 | Cummins et al. |
| 2021/0104008 A1 | 4/2021 | Ross et al. |
| 2021/0110014 A1 | 4/2021 | Ross et al. |
| 2021/0134434 A1 | 5/2021 | Riley et al. |
| 2021/0202067 A1 | 7/2021 | Williams et al. |
| 2021/0240837 A1 | 8/2021 | Tseng et al. |
| 2021/0258155 A1 | 8/2021 | Andon et al. |
| 2021/0279475 A1 | 9/2021 | Tusch et al. |
| 2021/0326467 A1 | 10/2021 | Levy et al. |
| 2021/0366014 A1 | 11/2021 | Wang et al. |
| 2021/0366586 A1 | 11/2021 | Ryan et al. |
| 2022/0292396 A1 | 9/2022 | Biryukov et al. |
| 2024/0064135 A1 | 2/2024 | Sherlock et al. |
| 2024/0185596 A1 | 6/2024 | Neuschäet al. |
| 2024/0214194 A1 | 6/2024 | Kapur et al. |
| 2024/0340314 A1 | 10/2024 | Radon et al. |

FOREIGN PATENT DOCUMENTS

| | | | |
|---|---|---|---|
| WO | WO-2011/016710 A1 | 2/2011 | |
| WO | WO-2016/083987 A1 | 6/2016 | |
| WO | WO-2019013818 A1 * | 1/2019 | ............ G06F 21/45 |
| WO | WO-2019/123291 A1 | 6/2019 | |

OTHER PUBLICATIONS

Yan Zhang et al., Real-time Machine Learning Prediction of an Agent-Based Model for Urban Decision-making, URL: https://ifaamas.org/Proceedings/aamas2018/pdfs/p2171.pdf (Jul. 10-15, 2018).

* cited by examiner

SECURE DIGITAL AUTHORIZATION BASED ON IDENTITY ELEMENTS OF USERS AND/OR LINKAGE DEFINITIONS IDENTIFYING SHARED DIGITAL ASSETS

CROSS-REFERENCE TO RELATED APPLICATIONS

This application is a continuation of U.S. patent application Ser. No. 17/901,550 entitled "SECURE DIGITAL AUTHORIZATION VIA GENERATED DATASETS" filed Sep. 1, 2022, the entirety of which is incorporated herein by reference.

TECHNICAL FIELD

The present disclosure relates to secure digital authorization via generated datasets.

BACKGROUND

Client applications can access resources from servers. In many cases, applications utilize authenticating information to permit access to information related to a user. However, obtaining or generating authenticating information is an inherently insecure and therefore challenging process, particularly when attempting to authorize multiple devices or users to access sets of digital resources.

SUMMARY

One aspect of the present disclosure relates to a method. The method may be performed, for example, by a computing system comprising one or more processors coupled to a non-transitory memory. The method may include receiving a first dataset related to a first user and a first security token. The first dataset may include first biometric data identifying the first user. The method may include receiving a second dataset related to a second user and a second security token. The second dataset may include second biometric data identifying the second user. The method may include generating, based on the first dataset, the second dataset, and the second security token a first set of identity elements in a first digital identity profile of the first user, and a first set of metadata corresponding to the first set of identity elements, the first set of identity elements including the second biometric data of the second user, and the first set of metadata identifying a linkage definition and a set activation elements. The method may include generating, based on the first dataset, the second dataset, and the first security token, a second set of identity elements in a second digital identity profile of the second user, and a second set of metadata corresponding to the second set of identity elements. The second set of identity elements may include the first biometric data, and the second set of metadata identifying the linkage definition and the set of activation elements. The method may include receiving, from a plurality of computing devices, a first set of inputs corresponding to the first user and the second user. The method may include determining, based on the first set of inputs, that the set of activation elements has been triggered. The method may include, in response to determining that the set of activation elements has been triggered, adding a trigger element to both the first set of metadata in the first digital identity profile and the second set of metadata in the second digital identity profile. The method may include, in response to determining that the set of activation elements has been triggered, generating a set of access tokens based on the first linkage definition. The set of access tokens may include one or more access tokens. The method may include receiving, from a first computing device identified in the first digital identity profile, biometric scan data. The method may include analyzing the biometric scan data to determine that the biometric scan data corresponds to the first biometric data in the second digital profile. The method may include, in response to determining that the biometric scan data corresponds to the first biometric data in the second digital profile, transmitting, to the first computing device, the set of access tokens to grant the first user access to select digital assets of the second user.

In some implementations, the first dataset may be received from the first computing device. In some implementations, the second dataset may be received from a second computing device identified in the second identity profile. In some implementations, the method can include generating the first security token and transmitting the first security token to a second computing device identified in the second identity profile. In some implementations, the method can include generating the second security token and transmitting the second security token to the first computing device. In some implementations, the first security token may be received from the first computing device and is generated by a second computing device identified in the second profile. In some implementations, the method may further include analyzing the first security token to verify that it was generated by the second computing device.

In some implementations, the second security token may be received from a second computing device identified in the second profile and is generated by the first computing device. In some implementations, the method may further include analyzing the second security token to verify that it was generated by the first computing device. In some implementations, the linkage definition may identify the select digital assets of the second user. In some implementations, the linkage definition may indicate that the select digital assets of the second user are to be provided to the first user upon triggering of the set of activation elements. In some implementations, the set of inputs may indicate that one or more conditions have been met.

In some implementations, the one or more conditions may be based on one or more geophysical locations of at least one of the first computing device or a second computing device identified in the second identity profile. In some implementations, the plurality of computing devices may include the first computing device and the second computing device. In some implementations, the plurality of computing devices may include one or more devices other than the first and second computing devices.

In some implementations, the one or more devices may be devices that are not part of the computing system. In some implementations, the first digital profile may include both the first biometric data and the second biometric data. In some implementations, the second digital profile may include both the first biometric data and the second biometric data. In some implementations, the set of access tokens may grant access to a secured network location including the select digital assets or network links thereto. In some implementations, the method can include transmitting the select digital assets or a subset thereof to the first computing device.

Another aspect of the present disclosure relates to a system. The system may include a computing system comprising one or more hardware processors coupled to a non-transitory memory. The system can receive a first dataset related to a first user and a first security token. The first dataset may include first biometric data identifying the first user. The system can receive a second dataset related to a second user and a second security token. The second dataset may include second biometric data identifying the second user. The system can generate, based on the first dataset, the second dataset, and the second security token a first set of identity elements in a first digital identity profile of the first user, and a first set of metadata corresponding to the first set of identity elements, the first set of identity elements including the second biometric data of the second user, and the first set of metadata identifying a linkage definition and a set activation elements. The system can generate, based on the first dataset, the second dataset, and the first security token, a second set of identity elements in a second digital identity profile of the second user, and a second set of metadata corresponding to the second set of identity elements. The second set of identity elements may include the first biometric data, and the second set of metadata identifying the linkage definition and the set of activation elements. The system can receive, from a plurality of computing devices, a first set of inputs corresponding to the first user and the second user. The system can determine, based on the first set of inputs, that the set of activation elements has been triggered. The system can, in response to determining that the set of activation elements has been triggered, add a trigger element to both the first set of metadata in the first digital identity profile and the second set of metadata in the second digital identity profile. The system can, in response to determining that the set of activation elements has been triggered, generate a set of access tokens based on the first linkage definition. The set of access tokens may include one or more access tokens. The system can receive, from a first computing device identified in the first digital identity profile, biometric scan data. The system can analyze the biometric scan data to determine that the biometric scan data corresponds to the first biometric data in the second digital profile. The system can, in response to determining that the biometric scan data corresponds to the first biometric data in the second digital profile, transmit, to the first computing device, the set of access tokens to grant the first user access to select digital assets of the second user.

In some implementations, the first dataset may be received from the first computing device. In some implementations, the second dataset may be received from a second computing device identified in the second identity profile. In some implementations, the system can generate the first security token and transmit the first security token to a second computing device identified in the second identity profile. In some implementations, the system can generate the second security token and transmit the second security token to the first computing device. In some implementations, the first security token may be received from the first computing device and is generated by a second computing device identified in the second profile. In some implementations, the method may further include analyzing the first security token to verify that it was generated by the second computing device.

In some implementations, the second security token may be generated by the first computing device and received from a second computing device identified in the second profile. In some implementations, the method may further include analyzing the second security token to verify that it was generated by the first computing device. In some implementations, the linkage definition may identify the select digital assets of the second user. In some implementations, the linkage definition may indicate that the select digital assets of the second user are to be provided to the first user upon triggering of the set of activation elements.

In some implementations, the set of inputs may indicate that one or more conditions have been met. In some implementations, the one or more conditions may be based on one or more geophysical locations of at least one of the first computing device or a second computing device identified in the second identity profile. In some implementations, the plurality of computing devices may include the first computing device and the second computing device. In some implementations, the plurality of computing devices may include one or more devices other than the first and second computing devices.

In some implementations, the one or more devices may be devices that are not part of the computing system. In some implementations, the first digital profile may include both the first biometric data and the second biometric data. In some implementations, the second digital profile may include both the first biometric data and the second biometric data. In some implementations, the set of access tokens may grant access to a secured network location including the select digital assets or network links thereto. In some implementations, the system can transmit the select digital assets or a subset thereof to the first computing device.

Yet another aspect of the present disclosure is directed to a method for generating security access tokens. The method may be performed, for example, by a computing system comprising one or more processors coupled to a non-transitory memory. The method may include retrieving, from a first digital identity profile of a first entity, a first set of identity elements and a first set of metadata corresponding to the first set of identity elements. The method may include retrieving, from a second digital identity profile of a second entity, a second set of identity elements and a second set of metadata corresponding to the second set of identity elements. The method may include generating a dataset based on a plurality of the first set of identity elements, the second set of identity elements, the first set of metadata, and the second set of metadata. The method may include inputting the dataset to an artificial intelligence (AI) agent to generate a linkage definition and a set of activation elements. The AI agent may have been trained by applying one or more machine learning models to a set of session logs corresponding to digital identity profiles of a cohort of linked entities wherein the linkage definition identifies one or more physical or digital assets of one or both of the first entity or the second entity. The set of activation elements may identify one or more states. The method may include receiving, from a plurality of computing devices, a set of inputs corresponding to the first entity and the second entity. The method may include determining, based on the set of inputs, that the set of activation elements has been triggered. The method may include, in response to determining that the set of activation elements has been triggered, generating a set of one or more security access tokens based on the linkage definition. The security access tokens may indicate that access to select digital or physical assets is granted for specified time periods. The method may include transmitting, by the computing system, the set of security access tokens to at least one of a first device identified in the first identity profile or a second device identified in the second identity profile.

In some implementations, applying the one or more machine learning models may include applying a pattern recognition model or a classification model to recognize normal or abnormal patterns of behavior. In some implementations, applying the one or more machine learning models may include applying a regression model to identify causal factors for one or more identity elements or corresponding metadata in digital identity profiles. In some implementations, applying the one or more machine learning models may include applying a decision model to identify actions suited to achieving particular goals based on available options.

In some implementations, the method can include adding the set of security access tokens to at least one of the first digital identity profile or the second digital identity profile. In some implementations, the set of access tokens may grant access to one or more digital files. In some implementations, the set of access tokens may grant access to one or more smart devices. In some implementations, the set of access tokens may grant access to one or more physical locations. In some implementations, the set of access tokens may grant access to one or more articles of manufacture.

In some implementations, the first set of identity elements and the first set of metadata may be received from a first computing system with the first digital identity profile. In some implementations, the second set of identity elements and the second set of metadata may be received from a second computing system with the second digital identity profile. In some implementations, retrieving the first set of identity elements and the first set of metadata may include transmitting a first application programming interface call to the first computing system. In some implementations, the method can include and retrieving the second set of identity elements and the second set of metadata includes transmitting a second API call to the second computing system.

In some implementations, the first digital identity profile and the second digital identity profile may be maintained by the computing system. In some implementations, the one or more states may be based on one or more geophysical locations of at least one of the first device or the second device. In some implementations, the plurality of computing devices may include the first device and the second device. In some implementations, the plurality of computing devices may include one or more devices other than the first device and the second device. In some implementations, the method can include adding the linkage definition and the set of activation elements to both the first digital identity profile and the second digital identity profile.

Another aspect of the present disclosure relates to a system configured for generating security access tokens. The system may include a computing system comprising one or more processors coupled to a non-transitory memory. The system can retrieve, from a first digital identity profile of a first entity, a first set of identity elements and a first set of metadata corresponding to the first set of identity elements. The system can retrieve, from a second digital identity profile of a second entity, a second set of identity elements and a second set of metadata corresponding to the second set of identity elements. The system can generate a dataset based on a plurality of the first set of identity elements, the second set of identity elements, the first set of metadata, and the second set of metadata. The system can input the dataset to an artificial intelligence agent to generate a linkage definition and a set of activation elements. The AI agent may have been trained by applying one or more machine learning models to a set of session logs corresponding to digital identity profiles of a cohort of linked entities wherein the linkage definition identifies one or more physical or digital assets of one or both of the first entity or the second entity. The set of activation elements may identify one or more states. The system can receive, from a plurality of computing devices, a set of inputs corresponding to the first entity and the second entity. The system can determine, based on the set of inputs, that the set of activation elements has been triggered. The system can, in response to determining that the set of activation elements has been triggered, generate a set of one or more security access tokens based on the linkage definition. The security access tokens may indicate that access to select digital or physical assets is granted for specified time periods. The system can transmit, by the computing system, the set of security access tokens to at least one of a first device identified in the first identity profile or a second device identified in the second identity profile.

In some implementations, applying the one or more machine learning models may include applying a pattern recognition model or a classification model to recognize normal or abnormal patterns of behavior. In some implementations, applying the one or more machine learning models may include applying a regression model to identify causal factors for one or more identity elements or corresponding metadata in digital identity profiles. In some implementations, applying the one or more machine learning models may include applying a decision model to identify actions suited to achieving particular goals based on available options. In some implementations, the system can add the set of security access tokens to at least one of the first digital identity profile or the second digital identity profile.

In some implementations, the set of access tokens may grant access to one or more digital files. In some implementations, the set of access tokens may grant access to one or more smart devices. In some implementations, the set of access tokens may grant access to one or more physical locations. In some implementations, the set of access tokens may grant access to one or more articles of manufacture. In some implementations, the first set of identity elements and the first set of metadata may be received from a first computing system with the first digital identity profile. In some implementations, the second set of identity elements and the second set of metadata may be received from a second computing system with the second digital identity profile. In some implementations, retrieving the first set of identity elements and the first set of metadata may include transmitting a first application programming interface call to the first computing system. In some implementations, retrieving the second set of identity elements and the second set of metadata includes transmitting a second API call to the second computing system.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are detailed descriptions of various concepts related to, and implementations of, techniques, approaches, methods, apparatuses, and systems for secure digital authorization via generated datasets. The various concepts introduced above and discussed in detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful:

- Section A describes techniques for secure digital authorization via generated datasets;
- Section B describes techniques for generating security access tokens; and
- Section C describes a computing environment which may be useful for practicing embodiments described herein.

A. Secure Digital Authorization Via Generated Datasets

Various embodiments described herein relate to secure digital authorization via generated datasets. Access to digital assets can be controlled using authentication credentials, and can take the form of any type of data structure. However, obtaining or generating authentication credentials for multiple parties or devices is an inherently insecure and therefore challenging process, particularly when attempting to authorize multiple devices or users to access sets of digital resources. For example, one or more parties may utilize an authentication credential, such as a password, for multiple secure digital assets. Additionally, providing a single authentication credential to multiple edge devices increases the likelihood of a breach due to the increased number of potential attack vectors.

To address these and other issues, embodiments described herein can generate datasets based on identity elements of multiple users, and generate linkage definitions that identify shared digital assets between the multiple users. The linkages can be used to generate a set of activation elements corresponding to the linkage definition, which can indicate whether certain trigger conditions have been met. The trigger conditions can be any type of digital or real-world event that, when met, causes the computing system to generate and transmit one or more security tokens to one of the first or second entities. The security tokens can be authenticated based on biometric data of the first or second entities, and access to the secured digital asset can be provided. These techniques therefore allow for the provisioning and authentication of security tokens that grant access to secured digital assets in response to activation conditions.

Figure 1:
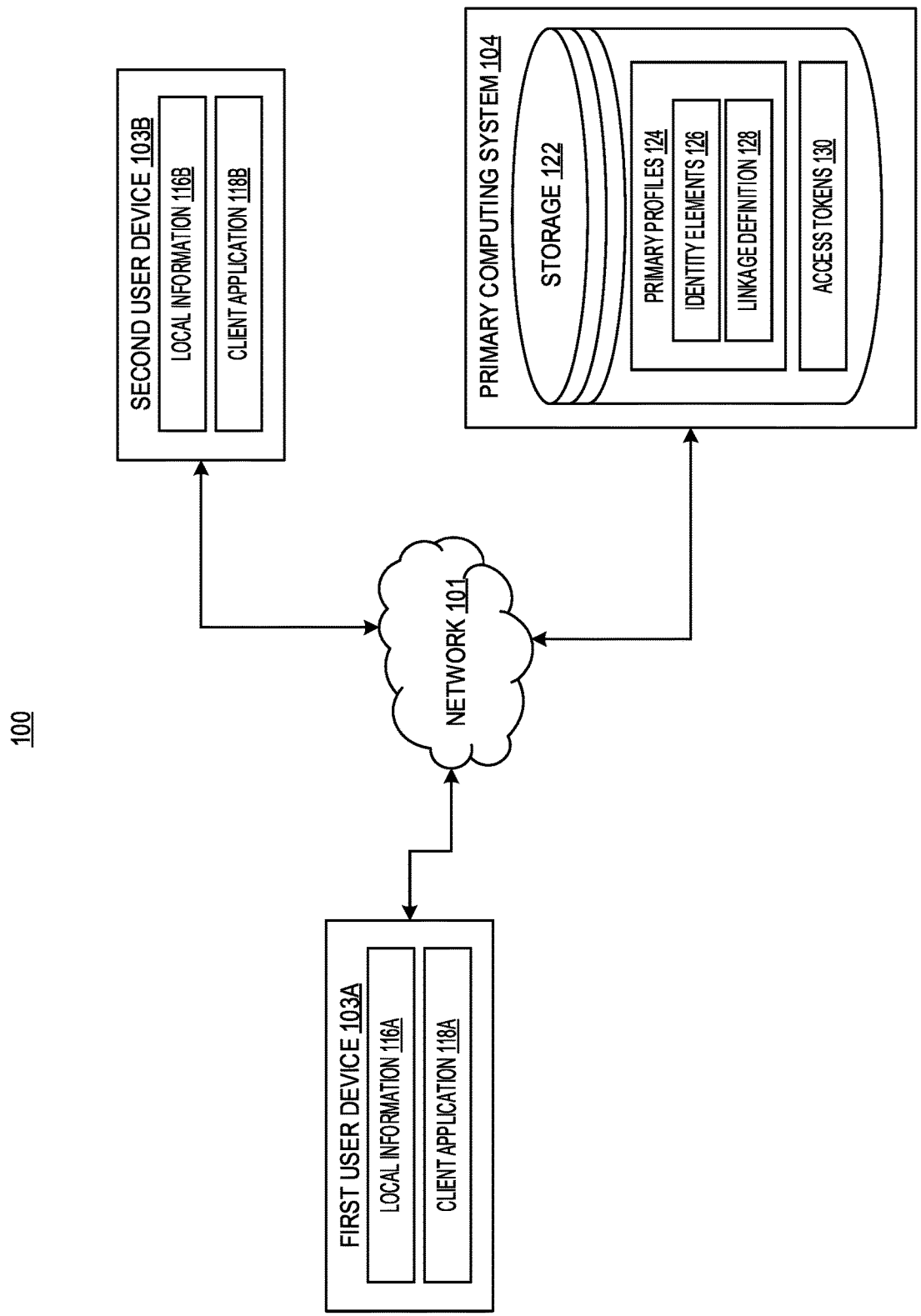
FIG. 1 is a block diagram of an example system for secure digital authorization via generated datasets, in accordance with one or more example implementations.

Referring to FIG. 1, illustrated is a block diagram of an example system 100 for secure digital authorization via generated datasets, in accordance with one or more example implementations. The system 100 may include a first user device 103A and a second user device 103B (sometimes collectively referred to the "user devices 103," or as the "user device 103" when referring to functionality or structure of either device individually) and a primary computing system 104. Each of the primary computing system 104 and the user devices 103 can be in communication with one another via the network 101. The network 101 can facilitate communications among the user devices 103 and the primary computing system 104 over, for example, the internet or another network via any of a variety of network protocols such as Ethernet, Bluetooth, Cellular, or Wi-Fi.

Each component of the system 100 may include one or more processors, memories, network interfaces, and user interfaces. The memory may store programming logic that, when executed by the processor, controls the operation of the corresponding computing device. The memory may also store data in databases. The network interfaces allow the computing devices to communicate wirelessly or otherwise. The various components of devices in system 100 may be implemented via hardware (e.g., circuitry), software (e.g., executable code), or any combination thereof.

The primary computing system 104 can include at least one processor and a memory (e.g., a processing circuit). The memory can store processor-executable instructions that, when executed by a processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The primary computing system 104 can include one or more computing devices or servers that can perform various functions as described herein. The primary computing system 104 can include any or all of the components and perform any or all of the functions of the computer system 700 described herein in conjunction with FIG. 7.

Each user device 103 can include at least one processor and a memory (e.g., a processing circuit). The memory can store processor-executable instructions that, when executed by a processor, cause the processor to perform one or more of the operations described herein. The processor may include a microprocessor, an ASIC, an FPGA, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. Each user device 103 can include one or more computing devices (e.g., desktop computers, laptop computers, servers, smartphones, tablets, etc.) that can perform various functions as described herein. Each user device 103 can include any or all of the components and perform any or all of the functions of the computer system 700 described herein in conjunction with FIG. 7.

Each user device 103 may include mobile or non-mobile devices, such as smartphones, tablet computing devices, wearable computing devices (e.g., a smartwatch, smart optical wear, etc.), personal computing devices (e.g., laptops or desktops), voice-activated digital assistance devices (e.g., smart speakers having chat bot capabilities), portable media devices, vehicle information systems, or the like. Each user device 103 may access one or more software applications running locally or remotely (e.g., the client applications 118A or 118B). Each user device 103 may operate as a "thin client" device, which presents user interfaces for applications that execute remotely (e.g., at the primary computing system 104, etc.). Each user device 103 can be associated with a respective device identifier. The identifier may be a universally unique identifier (UUID), a globally unique identifier (GUID), a media access control (MAC) address, an internet protocol (IP) address, a device serial number, a serial number of a component of each respective user device 103, a predetermined or randomly generated value associated with each respective user device 103, or any type of identifier that identifies each respective user device 103 or the components thereof. Input from the user received via each user device 103 may be communicated to the server (e.g., the primary computing system 104) executing the remote application, which may provide additional information to each user device 103 or execute further operations in response to the user input.

The first user device 103A includes a client application 118A and the second user device 103B includes a client application 118B. The client application 118A and the client application 118B are sometimes referred to as the "client application(s) 118." The client application 118A can include and perform all of the functionality of the client application 118B, and vice versa. The client application 118 can execute on a respective user device 103, and can provide one or more user interfaces and receive user input via one or more input/output (I/O) devices of the respective user device 103. The client application 118 may be provided by or be associated with the primary computing system 104. The client applications 118 may be web-based applications that are retrieved and displayed in a web-browser executing at the primary computing system 104. The client application 118 can execute locally at a respective user device 103 and may communicate information with the primary computing system 104 via the network 101. The client application 118 can access one or more device identifiers using an application programming interface (API) of an operating system of the respective user device 103. In some implementations, the client application 118 can access a predetermined region of memory where the user device 103 stores one or more device identifiers. Each of the user devices 103A and 103B may be similar or different types of computing devices. For example, the user device 103A may be a laptop and the user device 103B may be a smartphone.

Each client application 118A and 118B can present one or more user interfaces, for example, in response to user input or interactions with displayed interactive user interface elements. The user interfaces can be utilized to present information to the user or to receive information or input from the user. In an embodiment, the user interfaces can prompt the user to capture biometric scan data (e.g., images of the user's face, fingerprint scans, one or more voice samples, an iris scan (or an image of the user's eye), palm or finger vein patterns, retinal scans, etc.). The user interface may include interactive elements that, when interacted with, cause the user device 103 to transmit one or more requests, data packets, or other data related to the techniques described herein. For example, the client application 118 can provide identity elements 126 relating to a particular user, or one or more security tokens, to the primary computing system 104 as described herein. Additionally, the client application 118 may receive display instructions to display various content (e.g., text, graphics, video, prompts, alerts, notifications, indications, etc.) from the primary computing system 104. The user interfaces can include any type of interactive user interface element, including those that enable a user to provide information that can be stored in the primary profiles 124, send requests, or to navigate between user interfaces of the client application 118. Additionally, the client applications 118 can receive or present information relating to one or more secured digital assets provided by the primary computing system 104.

Each user device 103 can include one or more sensors, which may include one or more biometric sensors or ambient sensors, or any other type of sensor capable of capturing information about a user or an environment in which the user is present. The sensors can include components that capture ambient sights and sounds (such as cameras and microphones), and that allow the user to provide inputs (e.g., a touchscreen, stylus, force sensor for sensing pressure on a display screen, and biometric components such as a fingerprint reader, a heart monitor that detects cardiovascular signals, an iris scanner, and so forth). The sensors may include one or more location sensors to enable each user device 103 to determine its location relative to, for example, other physical objects or relative to geographic locations. Example location sensors include global positioning system (GPS) devices and other navigation and geolocation devices, digital compasses, gyroscopes and other orientation sensors, as well as proximity sensors or other sensors that allow each user device 103 to detect the presence and relative distance of nearby objects and devices.

The client applications 118 executing on the user devices 103 can include local information 116, which may include stored preferences (e.g., personal user settings, saved login information, stored authentication credentials, etc.) or other information relating to the use of the client application 118. The local information 116 can be stored in the memory of the user device 103, and can be accessed and modified by the respective user of each user device 103 by accessing corresponding user interfaces of the client application 118. In some implementations, the local information 116 can be transmitted to the primary computing system 104 for storage in the primary profile 124 of the respective user of the user device 103. The user, when accessing a client application 118 on a different device, can access the primary computing system 104 using an identifier of the primary profile 124 (e.g., login to the primary computing device 104), and synchronize (e.g., download and store) the local information 116 on the different device. This can enable the respective user of the user device 103 to utilize similar functionality across multiple user devices 103 owned or operated by the respective user.

The primary computing system 104 can be a computing system of an entity that maintains user identity profiles (e.g., the primary profiles 124) for a number of different users. The primary computing system 104 can provide information to the client application 118 executing on a respective user devices 103 of a corresponding user, such as user interfaces, instructions to carry out one or more functionalities described herein, or other information relating to one or more of primary profiles 124. For example, the primary computing system 104 can receive various datasets from the user devices 103A and 103B and utilize information in the datasets to generate or update corresponding primary profiles 124. A respective user can utilize the client application 118 of a respective user device 103 to communicate with the primary computing system 104, for example, to create, modify, delete, or authorize information in connection with a primary profile 124 associated with the user, including any of the functionality described herein (e.g., any operations described in connection with FIG. 3, etc.). The primary computing system 104 can be backend computer system that interacts with the user devices 103 and supports various services offered by the primary computing system 104, such as information technology (IT) services or network management services. The network management services may utilize the information in one or more of the primary profiles 124 to manage information communicated via the network 101.

The primary computing system 104 can include a storage 122, which may be any type of computer-accessible memory or database that can maintain, manage, or store primary profiles 124, for example, in one or more data structures. Each of the primary profiles 124 may correspond to a respective user, and may be identified by a corresponding user identifier (e.g., a username, an email address, a passcode, an encryption key, etc.). The primary profiles 124 can include one or more identity elements 126, which can include information about the user, including personally identifying data (e.g., name and social security number), psychographics data (e.g., personality, values, opinions, attitudes, interests, and lifestyles), transactional data (e.g., preferred products, purchase history, transaction history), demographic data (e.g., address, age, education), financial data (e.g., income, assets, credit score), or other user or account data that is maintained or otherwise accessible to the primary computing system 104. The primary computing system 104 can receive datasets to generate the identity elements 126 for a user from a respective user device 103 of the user, for example, in a request with a corresponding security token. The primary profiles 124 (sometimes referred to as an "identity profile" or an "identity databank") or the identity elements 126 thereof can be accessed via a client application 118, for example, by way of user input at a user device 103 corresponding to a respective user of the primary profile 124. The primary profile 124 can identify one or more user devices 103 of the user to which the primary profile 124 corresponds (e.g., and additional computing devices may be registered to the primary profile 124 by way of request including two-factor authentication, for example).

Figure 2:
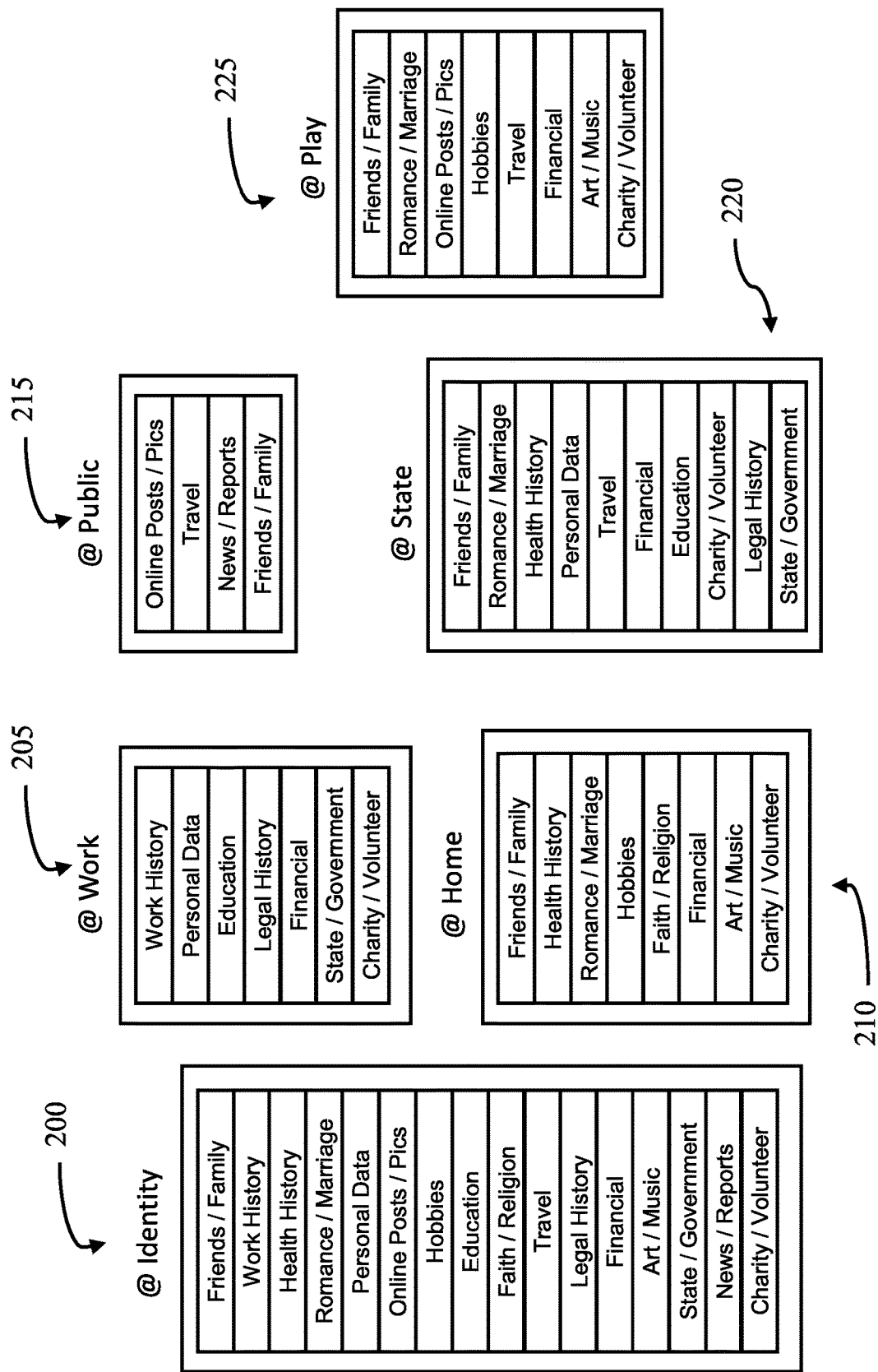
FIG. 2 illustrates a representation of an example set of contexts in which identity elements may be generated or used, or are otherwise relevant, in accordance with one or more example implementations.

Each of the primary profiles 124 can include various categories of the identity elements 126. A representation of various categories of the identity elements 126 that may be stored in a primary profile 124 is shown in FIG. 2. Referring to FIG. 2, illustrated is a representation of an example set of identity elements 126 that may be generated or stored in a primary profile 124. As shown, subsets of identity databank 200 ("@ identity") may include, for example, an "@ work" subset 205 with identity elements 126 related to, for example, "work history" and "education"; an "@ home" subset 210 with identity elements 126 related to, for example, "friends/family" and "romance/marriage"; an "@ public" subset 215 with identity elements 126 related to, for example, "online posts/pics" and "news/reports"; an "@ state" subset 220 with identity elements 126 related to, for example, "legal history" and "state/government"; and an "@ play" subset 225 with identity elements 126 related to, for example, "hobbies" and "travel." These different categories provide context for the arrays of identity elements 126 in the primary profile 126 of a user.

Additional categories, and corresponding identity elements 126, may also be stored in a primary profile 124 of a user. Non-exhaustive examples include a "geolocation" category, which may include identity elements 126 related to locations of a user or one or more user devices 103 of the user at various points of time (e.g., stored in association with timestamps, etc.). A category for "personal data" may include, for example, a name and birthdate of the user. A category for "health history" may include, for example, information that might be found in health records associated with the user, including any electronic medical records as well as electronic prescriptions or data associated therewith. A "romance/marriage" category may include, for example, information related to significant others and spouses of the user. A "work history" category may include, for example, information related to places and dates of employment, titles held, and relevant work experience of the user.

A "charity/volunteer" category may include information related to, for example, charitable contributions or volunteering activities performed or contributed by the user. An "online posts/pics" category may include, for example, textual posts and pictures/videos/other media submitted to social networking accounts via one or more user devices 103 of the user. A "hobbies" category may include, for example, leisure or other non-employment related activities of interest to the user. An "education" category may include, for example, identity elements 126 related to schools attended and degrees earned by the user. A "faith/religion" category may include, for example, identity elements 126 related to churches attended or religious activities of the user. A "travel" category may include, for example, identity elements 126 related to places visited by the user and corresponding timestamps or dates. A "transactions" category may include, for example, identity elements 126 related to purchases made by the user. A "legal history" category may include, for example, identity elements 126 related to legal proceedings involving the user.

A "financial" category may include, for example, identity elements 126 related to financial accounts of the user. An "art/music" category may include, for example, identity elements 126 related to attendance at concerts and types of art and music purchased or otherwise enjoyed by the user. A "state/government" category may include, for example, identity elements 126 related to licenses held by the user. A "news/reports" category may include, for example, information in broadcasts, publications, or reports that mention the user. A "family/friends" may include, for example, identity elements 126 related to children, siblings, and persons with whom the user spends time or otherwise associates. These and other categories or identity elements 126 of a user can be stored in a corresponding primary profile 124 of the user in the storage 122 of the primary computing system 104. The primary computing system 104 can receive one or more datasets (e.g., including information relating to the user) from a user device 104 of a user, and can generate one or more identity elements 126 including the information relating to the user in the primary profile 124 of the user.

Each identity element 126 can include or be associated with metadata. The metadata can be associated with a respective identity element 126 to allow for validation, geolocation, aging, or other operations. The metadata can include timestamps of when the respective identity element 126 was incorporated in the primary profile 124. As such, various identity elements 126 may correspond to a single category or aspect of the user, but may be distinguished from one another by metadata (e.g., timestamps, locations, etc.). As such, the identity elements 126 may be made immutable by various metadata. For example, although a user's hair color may change over time, the user's hair color at a specific time and place is not expected to change, and therefore can be stored with corresponding metadata to identify the user's hair at a particular place and time. The identity elements 126 may also include information corresponding to other users with which the user is associated. For example, if the user has a corresponding linkage definition 128 with another primary profile 124 of another user, the user's primary profile 124 may include identity element(s) 126 with biometric data of the other user, and vice versa.

In addition to storing one or more identity elements 126, the primary profiles 124 can include one or more linkage definitions 128. The linkage definitions 128 can describe associations between primary profiles 124 of different users. The linkage definitions 128 can identify at least two primary profiles 124 (or the users associated therewith), and can identify one or more digital assets of at least one of the users of the linkage definition 128. The linkage definition 128 can be a representation indicating that digital assets of at least one user are to be "linked," or shared, with at least one other user. The linkage definition 128 can be associated with one or more activation elements, which can be a set of conditions under which the digital asset identified in the linkage definition 128 is to be shared with the other user. One activation element can be, for example, if the user that is the owner or maintainer of the digital assets becomes deceased. The digital assets may be stored at third-party computing systems (not pictured) or at the primary computing system 104. The digital assets to which the linkage definitions 128 correspond can be, for example, any type of account, profile, or computing resource that is accessible to a computing device via the network 101, local communication (e.g., wired or local wireless communication), or other types of communication (e.g., user input).

The primary computing system can monitor the primary profile 124 to detect such an event and can provide one or more access tokens to the other user in accordance with the linkage definition 128. As described in greater detail herein, the primary computing system 124 can receive biometric scan data from the first user device 103A corresponding to a first primary profile 124. The biometric scan data can be part of a request to access one or more digital assets in accordance with the linkage condition 128 (e.g., if the set of activation elements have been satisfied, etc.). The primary computing system 104 can analyze the biometric scan data to determine whether the biometric scan data corresponds to biometric data in a primary profile 124 identified by linkage definition 128 associated with the user that provided the biometric scan data. Upon verifying that the biometric scan data corresponds to the biometric data in the other primary profile 124 identified in the linkage definition 128, the primary computing system 104 can transmit one or more access tokens (e.g., network access tokens, etc.) to the user device 103, to grant access to the digital assets of a second user.

The primary profiles 124 can be stored in association with one or more identifiers of one or more user devices 103. Identifiers of a primary profile 124 can be used by a client application 118 (e.g., with an authentication credential) to access the functionality of the primary computing system 104, which may include information relating to account functionality. The primary profile 124 may identify one or more accounts associated with the user. The identifiers of the primary profiles 124 can include a username, a password, an e-mail address, a phone number, a personal identification number (PIN), a secret code-word, or device identifiers for use in a two-factor authentication technique, among others.

A primary profile 124 may be created or updated by the primary computing system 104 in response to a primary profile 124 creation request transmitted by a user device 103. The user profile creation request can include any of the primary profile 124 information described herein. The primary profiles 124 (or the identity elements 126 thereof) can include information about an account (e.g., a financial account) maintained by an entity associated with the primary computing system 104. The information can include, for example, account balances, transaction histories, or brokerage trading information, among other account data. Additionally, various identity elements 126 of a primary profile 124 can include a list or table of secondary account (e.g., secondary profiles, etc.) identifiers associated with the user and maintained or stored at third-party computing systems. For example, various identity elements 126 corresponding to the secondary profiles can include authentication credentials (e.g., username, password, email, PIN, etc.) to access the secondary profile at the third-party computing system. Additionally, a primary profile 124 can be updated with additional information using the client application 118. For example, the client application 118 can transmit information to store in the primary profile 124 (e.g., one or more datasets that the primary computing system 104 can store as one or more identity elements 126) in a request to update the primary profile 124. The primary computing system 104 may request an authentication credential (e.g., using techniques similar to those described herein, including biometric data, etc.), and can update the primary profile 124 with the information in the request upon determining that the authentication credential is legitimate. For example, the primary computing system 104 can verify that the authentication credential is valid prior to updating the primary profile 124 with corresponding identity elements 126.

The primary computing system 124 can additionally store or maintain one or more access tokens 130, which may be stored in association with one or more corresponding primary profiles 124, as described herein. The access tokens 130 can be surrogate values that grant access to one or more digital assets, as described in further detail herein. The access tokens 130 can be generated using any suitable token generation process, including hashing of identifiers of one or more primary profiles, requests, or other data. The access tokens 130 can be stored in a token database or a token data structure, for example, in association with one or more digital resources, digital assets, identity elements 126, or other data, indicating that the access token 130 grants access to view or modify the data with which the access token 130 is associated. The access tokens 130 may be encoded values that are generated, for example, using a hashing algorithm or an encryption algorithm with random or predetermined data as input. The access tokens 130 can be surrogate values that authorize access to a secured network location. The secured network location may be a remote server, a network subdomain, or a cloud computing system that stores the digital assets of one or more users.

Information stored at the primary system 104 can be accessed, for example, by the user devices 103 using a communication application programming interface (API). The primary computing system 104 can maintain and provide the communications API. The communications API can be an API, such as a web-based API corresponding to a particular network address uniform resource identifier (URI), or uniform resource locator (URL), among others. The communications API can be accessed, for example, by one or more of the user devices 103 or the user device 103, via the network 101. In some implementations, other secondary computing systems can communicate with a primary computing system 104 via the communications API. The communications API can be a client-based API, a server API (SAPI), or an Internet Server API (ISAPI).

Various protocols may be utilized to access the communications API, including a representational state transfer (REST) API, a simple object access protocol (SOAP) API, a Common Gateway Interface (CGI) API, or extensions thereof. The communications API may be implemented in part using a network transfer protocol, such as the hypertext transfer protocol (HTTP), the secure hypertext transfer protocol (HTTPS), the file transfer protocol (FTP), the secure file transfer protocol (FTPS), each of which may be associated with a respective URI or URL. The communications API may be exposed to the user devices 103, which can execute one or more API calls to perform the various operations described herein. In an embodiment, the user devices 103 include an API that is similar to the communications API, which the user device 103 can use to communicate with the primary computing system 104 or various other computing systems to perform the various operations described herein.

Figure 3:
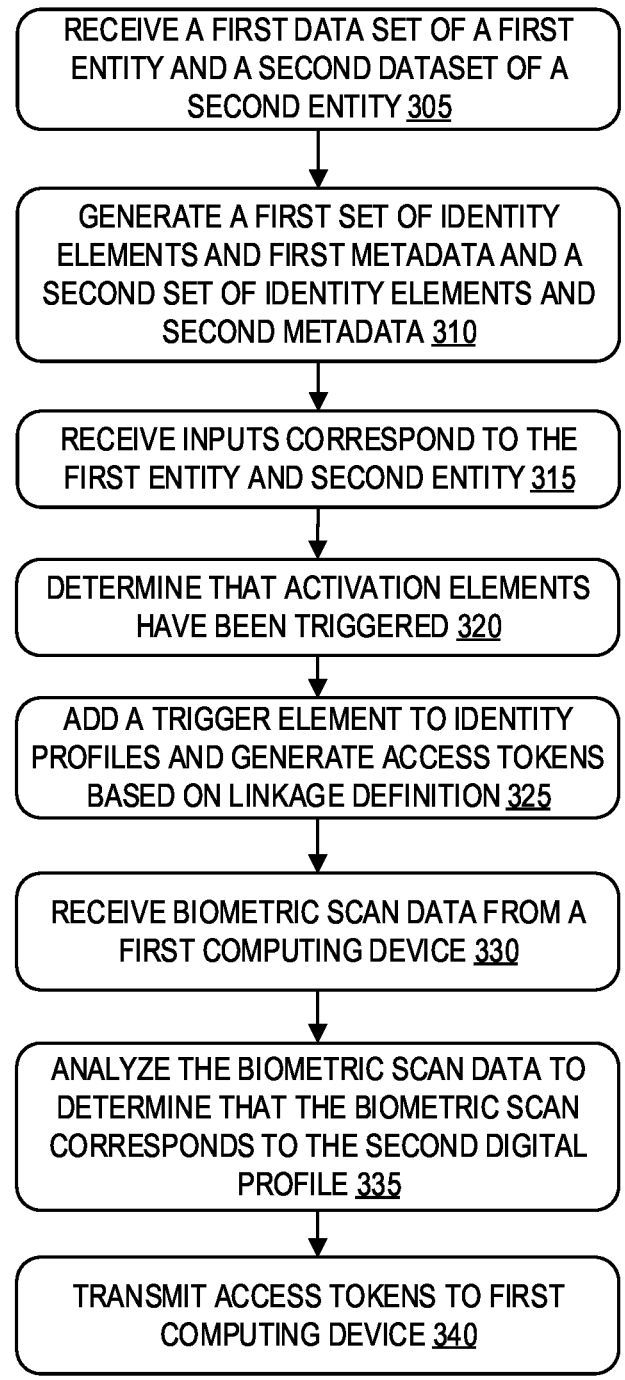
FIG. 3 is a flow diagram of an example method for secure digital authorization via generated datasets, in accordance with one or more example implementations.

Referring to FIG. 3, illustrated is a flow diagram of an example method 300 for secure digital authorization via generated datasets, in accordance with one or more example implementations. The method 300 can be a computer-implemented method. The method 300 may be implemented, for example, using any of the computing systems described herein, such as the primary computing system 104, the user device 103, or the computing system 700 described in connection with FIG. 7. In some implementations, additional, fewer, or different operations may be performed. It will be appreciated that the order or flow of operations indicated by the flow diagrams and arrows with respect to the methods described herein is not meant to be limiting. For example, in one implementation, two or more of the operations of method 300 may be performed simultaneously, or one or more operations may be performed as an alternative to another operation.

At step 305, the method 300 can include receiving a first dataset related to a first user and a first security token. The first dataset can include first biometric data and can identify the first user. For example, the primary computing system (e.g., the primary computing system 104) can receive the first data set from a first user device (e.g., the first user device 103A). The first dataset may be received as part of a request to generate a linkage definition (e.g., a linkage definition 128) corresponding to one or more specified digital assets. The request can identify a second user or a second primary profile (e.g., a second primary profile 124) corresponding to a second user. The first user device can access the functionality of the primary computing system using authentication credentials of a first primary profile (e.g., a first primary profile 124) of the first user. Additionally, the primary computing system can receive a second dataset related to the second user and a second security token. The second dataset can include second biometric data identifying the second user and can be transmitted to satisfy or to supplement the request transmitted by the first user device.

The first and second security tokens can be any type of token that corresponds to the first primary profile or the second primary profile. The first and second security tokens can be surrogate values that identify the first and second user devices, respectively, and provide access to the functionality of the primary computing system and authorize the primary computing system to modify or update the first and second primary profiles, respectively. In an embodiment, the security tokens can be generated by the primary computing system in response to requests from the first computing device or a second computing device (e.g., the second user device 103B). For example, the security tokens may be encoded values that are generated, for example, using a hashing algorithm or an encryption algorithm. The security tokens can be surrogate values that authorize the generation of linkage definition between the first primary profile and the second primary profile. The surrogate values can be generated using any suitable tokenization technique, including hashing a unique value, for example, a timestamp of one or more request(s) concatenated with an identifier of the first and second primary profiles (and in some implementations, further concatenated with an additional salt value).

The first security token can be generated by the primary computing system prior to receiving the first and second datasets, for example, in response to a request from the first or second computing devices. The first security token can be generated and transmitted to the second computing device identified in the second primary profile (e.g., in response to a corresponding request from the first or second computing device), and the second security token can be generated and transmitted to the first computing device. Upon receiving each of the first and second security tokens, the first and second computing devices can exchange the security tokens (e.g., via wireless or short-range communication protocols), and each computing device can proceed to scan and transmit corresponding biometric scan data in the first and second datasets, respectively. Alternatively, the first security token can be generated by the second computing device and provided to the first computing device, which transmits the first security token to the primary computing system with the first dataset. The primary computing system can then analyze the first security token (e.g., compare it to a corresponding security token transmitted to the primary computing system by the second computing system when the security token was generated) to verify that it was generated by the second computing device. In such embodiments, the second security token can be generated by the first computing device using similar techniques, and the primary computing system can perform similar operations to analyze the second security token to verify that it was generated by the first computing device.

The first and second biometric data can be generated by the first and second computing system, respectively, and can include any biometric data of the first and second user, respectively. For example, the biometric information can include, but is not limited to, images of the respective user's face, fingerprint scans, one or more voice samples, an iris scan (or an image of the user's eye), palm or finger vein patterns, or retinal scans, among others. In an embodiment, the first and second biometric data may be captured by different types of sensors (e.g., one is a fingerprint scan, the other is an image of face, etc.). Likewise, in another embodiment, the first and second biometric data can include similar types of biometric information from each of the first and second user.

At step 310, the method 300 can include generating, based on the first dataset, the second dataset, and the second security token, a first set of identity elements (e.g., one or more identity elements 126) in the first primary profile (e.g., a first digital identity profile) of the first user and a first set of metadata corresponding to the first set of identity elements. As described herein, the identity elements in the primary profile can include any type of information relating to the user, including information associated with requests for linkage definitions. In an embodiment, the primary computing system can verify the second security token received from the first computing device (e.g., which can be associated with the secondary computing device) and can generate corresponding data structures to include the biometric data captured by the first user and the second user (e.g., and included in the first and second datasets). The first identity elements stored in the first primary profile can be identified with corresponding metadata, which may include identifiers of the first and second computing devices, first and second users, location data of the first or second computing devices, as well as timestamp information corresponding to when the information in the first and second datasets were captured by the first and second computing devices.

As such, the first primary profile of the first user can be updated to include the generated first set of identity elements, which include the second biometric data of the second user. This can effectively "link" the first primary profile to the second user, as the first primary profile can include the biometric data of the second user. Additionally, the primary computing system can generate a linkage definition (e.g., a linkage definition 128) in the first primary profile of the first user, which may specify one or more digital assets identified by the first user in the first dataset (e.g., selected via one or more user interfaces at the first computing device by the first user). The primary computing system can perform similar techniques to generate, based on the first dataset, the second dataset, and the first security token, a second set of identity elements (e.g., identity elements 126) in the second primary profile (e.g., a second digital identity profile) of the second user and a second set of metadata corresponding to the second set of identity elements. The second set of identity elements can be generated upon verifying that the first security token corresponds to the first user or the first computing device. The second set of identity elements can include the first biometric data (e.g., of the first user), such that the second primary profile includes the biometric information of the first user. The second set of metadata, which can be stored in association with the second set of identity elements, can include or identify the linkage definition stored in association with the first primary profile, effectively linking the first primary profile of the first user and the second primary profile of the second user. In an embodiment, one or more of the first or second primary profiles can include identity elements for both the first biometric data and the second biometric data.

As described herein, the generated linkage definition can identify the digital assets of the second user or the first user that are selected to be shared by the first user or the second user. The linkage definition generated by the primary computing system in response to the first and second datasets can identify the first and second dataset. In an embodiment, the first and second dataset can include one or more digital assets of the first or second user that are specified (e.g., selected via one or more graphical user interface elements at the first or second computing device) by the first or second user. The linkage definition can be a representation indicating that digital assets of the first or second user are to be "linked," or shared, with the other of the first or second user.

The linkage definition can be generated by the primary computing system with one or more activation elements. The activation elements can be a set of conditions under which the digital asset(s) identified in the linkage definition is to be shared with the other user(s). One activation element can be, for example, if the user that is the owner or maintainer of the digital assets becomes deceased. Alternatively conditions can also be provided, such as specified periods of time, particular locations (e.g., when one user is on vacation), or other types of conditions. The digital assets may be stored at third-party computing systems (not pictured) or at the primary computing system. The digital assets to which the linkage definitions correspond can be, for example, any type of account, profile, or computing resource that is accessible to a computing device via a network (e.g., the network 101), local communication (e.g., wired or local wireless communication), or other types of communication (e.g., user input). The activation elements can be specified by the first or second user as part of the first dataset.

For example, the activation elements can be provided or specified, and may include life events (e.g., death of a user, if the user is married, when the user has a predetermined credit score, when the user purchases a home, any other type of life event, etc.), or can correspond to other types of user-specified events (e.g., when the user leaves the country or goes on vacation, a predetermined time period when the digital assets can be accessed or provided to the second user, etc.). Generally, the activation elements can include any type of condition that may be specified by the first or second user and can include conditions relating to the identity elements stored in each of the first and second primary profiles of the first and second user. The linkage definition generated by the primary computing system can indicate that the select digital assets of the second user are to be provided to the first user, or vice versa, upon triggering of the set of activation elements.

At step 315, the method 300 can include receiving, from a plurality of computing devices, a first set of inputs corresponding to the first user or the second user. The plurality of computing devices can include, for example, the first computing device or the second computing device. Additionally or alternatively, the plurality of computing devices can include one or more devices other than the first and second computing devices, or otherwise devices that are not part of the primary computing system, such as third-party devices or other devices of users that are associated with the first user or the second user.

These computing devices can communicate with the primary computing system via a network (e.g., the network 101), and can provide various user input. The user input can be any type of informational input that may relate to the first user or the second user, and may include information that can be used to update the first primary profile of the first user or the second primary profile of the second user. The input can be, for example, data provided by the first computing device, the second computing device, or another computing device that indicates that one or more conditions have been met. The conditions can include, for example, an indication that one or more geophysical locations of at least one of the first computing device or the second computing device are within a predetermined region or area (e.g., one or more of the first user or the second user are on vacation). Any other condition can also be indicated by the user input, including an indication that the first user or the second user is deceased, incapacitated, or unwell, an indication that the current time satisfies a predetermined time period, or any other type of condition. The conditions can correspond to at least one of the set of activation elements of the linkage definition associated with the first primary profile or the second primary profile.

At step 320, the method 300 can include determining, based on the first set of inputs, that the set of activation elements has been triggered. The primary computing system can compare the data provided by the set of user inputs to the set of activation elements, to identify if any of the conditions corresponding to the set of activation elements are satisfied. The conditions can include, for example, an indication that one or more geophysical locations of at least one of the first computing device or the second computing device are within a predetermined region or area (e.g., one or more of the first user or the second user are on vacation). Any other condition can also be indicated by the user input, including an indication that the first user or the second user is deceased, incapacitated, or unwell, an indication that the current time satisfies a predetermined time period, or any other type of condition. Upon determining that at least one of the activation elements are satisfied, the primary computing system can proceed to execute step 325 of the method 300. In another embodiment, the set of activation elements can provide that a predetermined group of activation elements (e.g., a predetermined number, a predetermined subset, etc.) must be met before proceeding to execute step 325 of the method 300. In yet another embodiment, all of the set of activation elements must be satisfied to proceed.

At step 325, the method 300 can include adding a trigger element to both the first set of metadata in the first digital identity profile and the second set of metadata in the second digital identity profile. The trigger element can be an indication of which of the set of activation elements were satisfied. The trigger element can further include additional metadata relating to the set of activation elements, such as a timestamp corresponding to a time that the activation elements were satisfied, location data corresponding to locations of the first computing device and the second computing device when the set of activation elements were satisfied, a link to the particular data (e.g., which may also be stored as part of the first or second primary profiles) that satisfied the set of activation elements, among any other types of metadata. The trigger element can be added in response to determining that the set of activation elements has been triggered, and can itself be stored as part of the identity elements in the first or second primary profile. In an embodiment, the trigger element can be stored in both the first and second primary profiles. In another embodiment, the trigger element can be stored only in the primary profile of the user who owns the data assets identified in the linkage definition.

Upon adding the trigger element, the primary computing system can generate a set of access tokens for the digital assets based on the first linkage definition. The set of access tokens can be any type of token that can grant access to a secured network location comprising the select digital assets or network links thereto. The access tokens may be encoded values that are generated, for example, using a hashing algorithm or an encryption algorithm with random or predetermined data as input. The access tokens can be surrogate values that authorize access to a secured network location. The secured network location may be a remote server, a network subdomain, or a cloud computing system that stores the digital assets of the first or second user.

The access tokens (e.g., the surrogate values) can be provided to the secured network location in a request for the digital assets, and the secured network location can verify or authenticate the access tokens using a verification process (e.g., comparing the access tokens to corresponding tokens stored at a secure network location), and can provide access to the digital assets if the verification process is successful. The access tokens can be generated using any suitable tokenization technique, including hashing a unique value, for example, a timestamp of one or more request(s) concatenated with an identifier of the first and second primary profiles (and in some implementations, further concatenated with an additional salt value). In an embodiment, the access tokens can be generated by transmitting a request to the secure network location, which can generate the tokens and can provide the tokens to the primary computing system, while storing a local copy for verification. In another embodiment, the primary computing system can provide the access tokens to the secure network location for verification. In an embodiment, the primary computing system can transmit a notification to the computing device of the grantee (e.g., the user granted access to the digital assets upon the activation elements being satisfied) that indicates the activation elements have been satisfied. In this example, the computing device of the grantee is the first computing device; however, in another embodiment, the computing device of the grantee can be the second computing device.

At step 330, the method 300 can include receiving, from the first computing device corresponding to the first primary profile, biometric scan data. The biometric scan data can be transmitted in a request for the one or more access tokens, for example, upon receiving a notification from the primary computing system that indicates the activation elements have been satisfied. The biometric scan can be performed at the first computing device using one or more sensors of the first computing device. The biometric scan data can include, but is not limited to, images of the respective user's face, fingerprint scans, one or more voice samples, an iris scan (or an image of the user's eye), palm or finger vein patterns, or retinal scans, among others. In an embodiment, the first and second biometric data may be captured by different types of sensors (e.g., one is a fingerprint scan, the other is an image of face, etc.). The biometric scan data can be transmitted to the primary computing system in a request for the one or more access tokens. It is noted that, in various embodiments, authentication credentials (other than biometric scan data) can additionally or alternatively be received.

At step 335, the method 300 can include analyzing the biometric scan data to determine that the biometric scan data corresponds to the first biometric data in the second digital profile. The primary computing system can analyze the biometric scan data to determine whether the biometric scan data corresponds to biometric data in a primary profile identified by linkage definition associated with the user that provided the biometric scan data. For example, the primary computing system can extract one or more features from the biometric scan data. The features can include, for example, fast Fourier transform features, time domain features, or other types of features that can be extracted from biometric scans. The primary computing system can compare the extracted features to corresponding biometric features of the first user stored in the second primary profile (e.g., the primary profile of the grantor, or the owner of the digital assets). The primary computing system can calculate a match score by comparing the biometric scan data (or the features thereof) to the biometric scan in the second primary profile. The score can indicate a degree of similarity between the biometric data, with a high score indicating a high likelihood of a match and a low score indicating a low likelihood of a match. If the score is above a predetermined threshold, the primary computing system can proceed to execute step 340 of the method 300. If the score is below the predetermined threshold, the primary computing system can transmit an error message or notification to the first computing system indicating the error, and request a new set of biometric data (e.g., to perform the operations of step 335 again). Upon a predetermined number of failures, the first computing device may be prevented or blocked (e.g., using a firewall rule or a timer-based rule) from communicating with the primary computing system. In certain embodiments, step 335 may be, or may involve, biometric verification based on a comparison of a sample (e.g., biometric scan data) to a previously enrolled biometric template, and if a score resulting from the comparison is below a threshold, the biometric verification is deemed to have failed, and if the score is at least as great as the threshold, the biometric verification is deemed to have passed.

At step 340, the method 300 can include transmitting the set of access tokens to the first computing device to grant the first user access to select digital assets of the second user. The primary computing system can transmit the access tokens to the first computing device in response to determining that the biometric scan data corresponds to the first biometric data in the second primary profile. In embodiment where the primary computing system stores or maintains the digital assets, the primary computing system can transmit the select digital assets or a subset thereof to the first computing device. The first computing device can utilize the access tokens to access the digital assets at a corresponding secured network location, which may be a remote server, a network subdomain, or a cloud computing system that stores the digital assets of the second user.

B. Generating Security Access Tokens

Various embodiments described herein relate to techniques for generating security access tokens. As described herein, computer network security is paramount because modern computer networks are often utilized to share or transmit private or otherwise personally identifying information. This is particularly important when sharing information between users utilizing two different computing devices. The present techniques can be utilized to automatically generate security access tokens that grant access to digital assets of various entities. To do so, the present techniques involve the execution of a machine-learning agent, which is trained to output linkage definitions and activation functions based profile data, which may include identity elements as described herein, provided as input data. The present techniques execute the machine-learning agent to automatically generate the linkage definition and activation elements from profile data of multiple entities, thereby enabling the automatic verification and access to digital assets by related entities. Therefore, the exposure of authentication credentials to create linkage definitions between primary profiles is significantly reduced, thereby reducing computing network consumption and improving network security.

Figure 4:
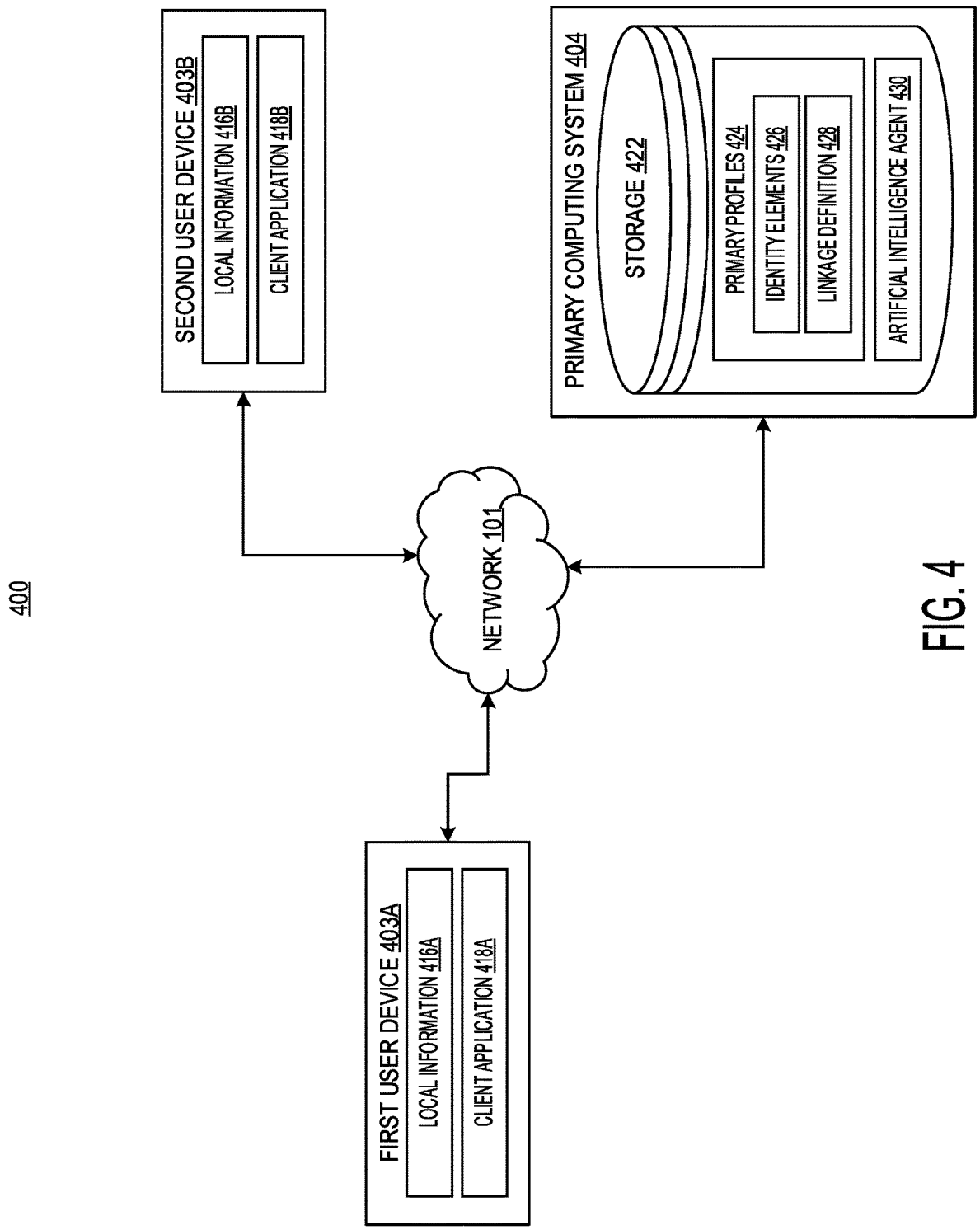
FIG. 4 is a block diagram of an example system for generating security access tokens, in accordance with one or more example implementations.

Referring to FIG. 4, illustrated is a block diagram of an example system 400 for generating security access tokens, in accordance with one or more example implementations. The system 400 can be similar to the system 100 described herein in connection with FIG. 1, and include similar components and computing systems. For example, the system 400 may include a first user device 403A and a second user device 403B (sometimes collectively referred to the "user devices 103," or as the "user device 103" when referring to functionality or structure of either device individually), and a primary computing system 404. Each of the primary computing system 404 and the user devices 403 can be in communication with one another via the network 101, as described in connection with FIG. 1.

Each of the components of the system 400 may be similar in structure to, and include any of the structure or functionality of, the system 100 described in connection with FIG. 1, and vice versa. For example, the primary computing system 404 may be similar to the primary computing system 104, the user device 403A may be similar to the user device 103A, and the user device 403B can be similar to the user device 103B.

Likewise, each of the components of the computing systems described in the system 400 may be similar to their counterparts in the system 100. The client application 418 may be similar to, and can implement any of the functionality of, the client application 118, including presenting various user interfaces and receiving user input as described herein and creating or updating the local information 416 (which may be similar to the local information 116). The storage 422 of the primary computing system 404 can be similar to the database 122 of the primary computing system 104. The primary computing system 404 can implement a communication API to communicate with the various computing systems described herein. Additionally, the primary profiles 424, the identity elements 426, and the linkage definition 428, may be similar to the primary profiles 124, the identity elements 126, and the linkage definition 428. Any of the structure, functionality, or operations of the system 100 can be included in or implemented by the system 400, and vice versa. Similar components can perform similar operations, and may include similar structure and functionality.

The artificial intelligence agent 430 can include one or more trained machine-learning models that are executed by the primary computing system 404 to carry out any of the functionality described herein. For example, the artificial intelligence agent 430 can include trained regression, pattern recognition, or classification models that can identify or determine relationships between different users based on information in the primary profiles 424 of the users. The machine-learning models of the artificial intelligence agent 430 can be trained by the primary computing system 404 using by performing a training process based on a set of session logs corresponding to the primary profiles 424 of a cohort of linked entities (e.g., users with predefined relationships). Further details of an example process to train the artificial intelligence agent are described in connection with FIG. 5.

The artificial intelligence agent 430 can include any type of model and may be executed on retrieved text, image, video, audio data, or the identity elements 426 to generate linkage definitions and activation elements corresponding thereto. The linkage definitions 428 generated by executing the models of the artificial intelligence agent 430 can include one or more physical or digital assets of one or more entities to which the linkage definitions 428 correspond. Some examples of machine learning models can include neural networks (e.g., a deep neural network (DNN), a convolutional neural network (CNN), a recurrent neural network (RNN) such as a long short-term memory (LSTM) model, combinations thereof, etc.), trained regression models (e.g., linear regression, sparse vector machine (SVM) models, logistic regression, polynomial regression, ridge regression, Lasso regression, Bayesian linear regression, etc.), or other types of classifiers (e.g., naïve Bayes, decision trees, k-nearest neighbors (kNN), extreme gradient boost (XGBoost) models, etc.). The artificial intelligence agent 430 can further include unsupervised machine-learning models. The aforementioned machine-learning models may also be utilized for any type of machine-learning or artificial intelligence performed task described herein.

The artificial intelligence agent 430 can be trained using any suitable machine-learning training technique. For example, the artificial intelligence agent 430 can be trained using supervised learning techniques, unsupervised learning techniques, or semi-supervised learning techniques. In an embodiment, the primary computing system 404 can train the artificial intelligence agent using sets of training data. Further details of a process for training the artificial intelligence agent 430 are described in connection with FIG. 5.

Figure 5:
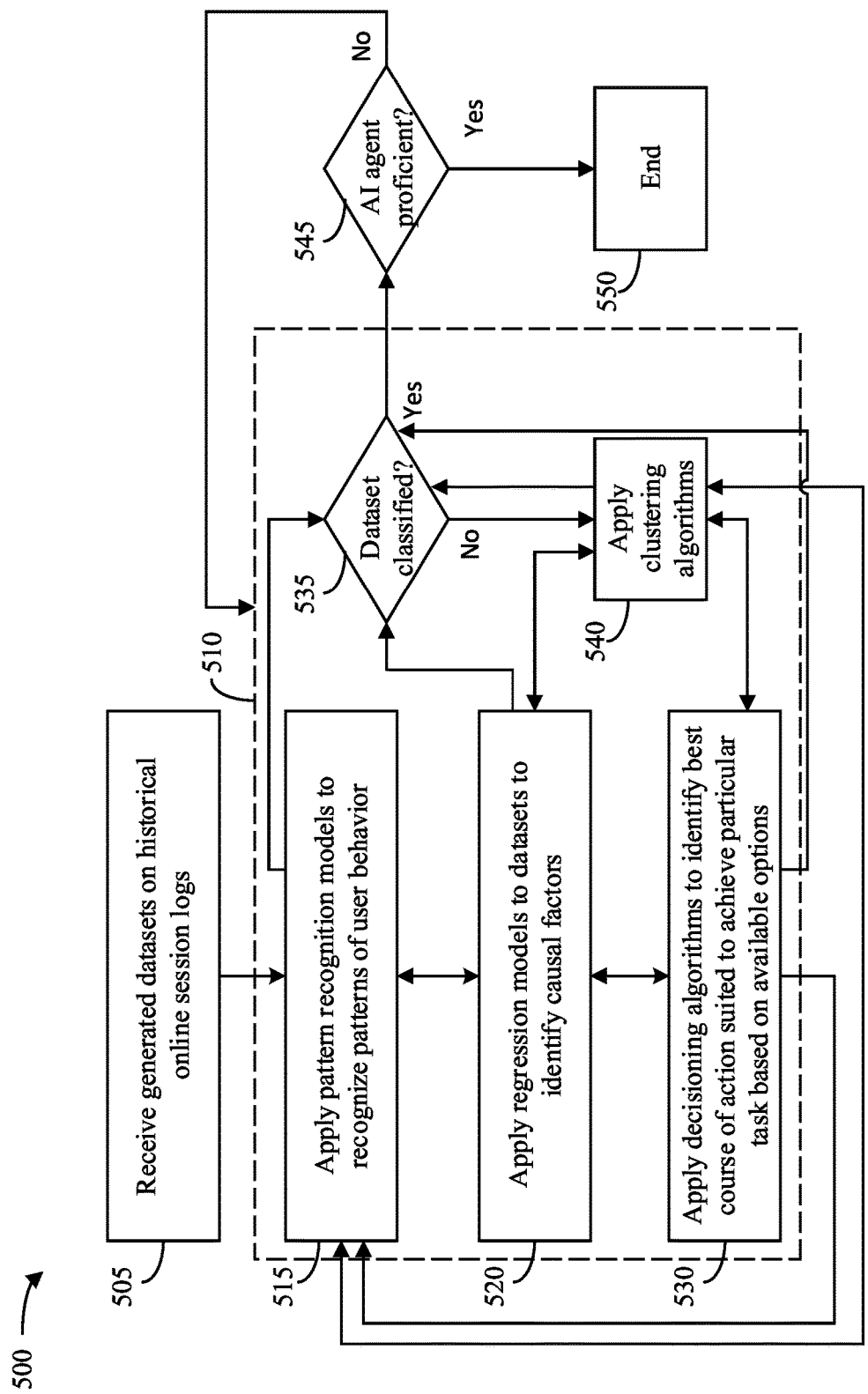
FIG. 5 is a flow diagram of an example process for training an artificial intelligence agent that may be executed to perform one or more operations described herein, in accordance with one or more example implementations.

Referring to FIG. 5, illustrated is a process 500 of an example approach for applying various models to the generated datasets for training an artificial intelligence agent (e.g., the artificial intelligence agent 430) to reach a certain proficiency level (e.g., accuracy threshold, etc.), according to potential embodiments. Process 500 may be implemented by the primary computing system 404, or any other computing device described herein. Input of which models to use, or of the modified models to be used, to generate the datasets also may be received via a network (e.g., the network 101) from one or more user devices (e.g., the user devices 403). At 505, the primary computing system may receive generated datasets on historical online sessions, which may be monitored or accessed by the primary computing system (e.g., from records of electronic activity generated by various user devices of different entities and their interactions, etc.). In some implementations, the generated datasets are created by sorting, categorizing, extracting, and/or manipulating acquired data from the online sessions or from other electronic activity detected or received via the network.

After step 505, process 500 proceeds to 510, where the primary computing system may apply machine-learning techniques to train the artificial intelligence agent. The machine-learning techniques may be executed by one or more processors of the primary computing system and may be updated via input from one or more user devices, such as an administrator device that manages the primary computing system or coordinates its operations in some capacity. The algorithms may encompass a variety of machine-learning techniques that are executed by the primary computing system to train one or more trainable parameters of the machine-learning models described herein. For example, the artificial intelligence model can be trained utilizing various input data, such may include information extracted from one or more primary profiles (e.g., the primary profiles 424), including identity elements (e.g., the identity elements 426) thereof. The training data can be generated or can otherwise include data from primary profiles that have known associations or have been preconfigured to share digital assets. The nature of the digital assets, including the linkage definitions (e.g., the linkage definitions 428) that associate the users (sometimes referred to as entities) in the training data can be utilized as ground-truth information for a supervised or semi-supervised learning process.

At 515, in an embodiment, the primary computing system may apply pattern recognition algorithms to recognize patterns of user behavior. Regression algorithms may be applied by the primary computing system, for example, to identify causal factors for one or more identity elements or corresponding metadata in the primary profiles for one or more users (step 520). For example, at 520, regression algorithms may be employed to train the artificial intelligence one or more trainable parameters that indicate whether input data of primary profiles should result in a linkage definition (and a corresponding set of activation elements). Some examples of regression techniques that may be used by the artificial intelligence agent include linear regression models, logistic regression models, SVM techniques, Least Absolute Selection Shrinkage Operator (LASSO) regression models, polynomial regression models, and other regression tree models.

At 530, the primary computing system may apply decisioning algorithms to identify a best course of action suited to achieve a particular task based on one or more available options (e.g., whether or not to generate a linkage definition, which activation elements to generate and associate with the linkage definition, etc.). The artificial intelligence agent may be instructed (e.g., via user input or via a received request) to perform one or more tasks, including analyzing one or more primary profiles, determining whether to generate a linkage definition based on the primary profiles, generating the linkage definition and one or more activation elements corresponding to the linkage definition, among other operations.

At 540, if the artificial intelligence agent cannot determine whether to generate a linkage definition between two or more primary profiles (e.g., a confidence score generated by the artificial intelligence agent is less than a predetermined threshold) (step 535), the primary computing system may apply clustering algorithms to employ additional machine-learning techniques to classify the primary profiles into a nearest related cluster in a set of primary profiles. The number of clusters may be communicated to the primary computing system from an administrative computing device via the network to limit or expand the training of the artificial intelligence agent, or may be variable depending on the data acquired from the historical online sessions of the various users corresponding to the primary profiles. In some embodiments, the number of clusters can be predetermined so as to fit the tasks from the online sessions and user activity of customers into a preferred number of clusters. In various embodiments, the cubic clustering criterion (CCC) statistic may be calculated (from SAS procedure FASCLUS) to determine the maximum number of clusters to allow for training the artificial intelligence agent.

In some implementations, identity elements of primary profiles (and therefore indications of whether a linkage definition should be generated between at least two primary profiles) can be categorized using a k-means clustering algorithm that is unsupervised, with no dependent variable associated therewith. Alternatively or additionally, other approaches can be used to detect a sequence or pattern of behavior in the demographics of customers and completing various tasks on the online software application successfully. For example, LSTM recurrent neural networks, gradient boosted trees, logistic regression, hidden and basic Markov models, and frequent pattern growth algorithms may be utilized in classifying patterns and decisions while training the artificial intelligence agent.

In some embodiments, clusters may be developed using, for example, Python, SAS, R, Spark and/or H20. In certain versions, k-means clustering may be developed using the SAS FASTCLUS procedure, which performs a disjoint cluster analysis on the basis of distances computed from one or more quantitative variables. The observations (e.g., potentially common identity elements) may be divided into clusters such that every observation belongs to one and only one cluster. The clusters do not form a tree structure. The FASTCLUS procedure uses Euclidean distances, so the cluster centers are based on least-squares estimation. This kind of clustering method is often called a k-means model. The clustering aims to partition n observations into k clusters in which each observation belongs to the cluster with the nearest mean. The final cluster centers are the means of the observations assigned to each cluster when the algorithm is run to complete convergence. Each iteration reduces the least-squares criterion until convergence is achieved.

For example, given a set of observations $(x_1, x_2, \ldots, x_n)$, where each observation is a d-dimensional real vector, k-means clustering aims to partition the n observations into $k(\leq n)$ sets $S=\{S_1, S_2, \ldots, S_k\}$ so as to minimize the within-cluster sum of squares ("WCSS") (i.e., variance). Formally, the objective is to find:

$$\arg\min \sum_{i=1}^{k} \sum_{x \in S_i} \|x - \mu_i\|^2 \qquad \text{Eq. 1}$$

where $\mu_i$ is the mean of points in $S_i$.

While the primary computing system executes the machine-learning techniques, one technique may be applied (such as at 515) before a different type of machine-learning technique is carried out (such as at 520). Instead of proceeding to 530, however, it may be needed to apply the same machine-learning technique used before (such as repeating 515) to make a new decision or after discovering a new situation of user activity or additional identity elements generated by the primary computing system (which is represented by the double arrows between different steps in process 500). For example, process 500 may continue to step 535 to check whether a dataset is classified after 515, 520, 530, or 540. In some embodiments, after step 530 is executed, process 500 may continue to 515, 520, or 540 for further training instead of continuing to step 535. In other embodiments, 540 is executed before checking whether the dataset is classified at 535 (e.g., 515 continues to 540 and/or 520 continues to 540). Additionally, after clustering algorithms are applied at 540, process 500 may continue to 515, 520, 530, or immediately recheck whether the dataset is classified (e.g., whether the dataset indicates a linkage definition should be generated as indicated in the ground-truth data) by proceeding to 535, in some examples. This multidirectional flow in process 500 may occur when more pattern recognition algorithms or other machine-learning techniques are utilized. In various embodiments, the primary computing system may determine how to proceed throughout process 500 at least in part based on user inputs from an administrative computing system.

At 545, the primary computing system may determine whether the artificial intelligence agent has achieved a sufficient proficiency level. The proficiency level may be determined by comparing an accuracy of the artificial intelligence model satisfies one or more predetermined thresholds. The accuracy of the artificial intelligence agent can be tested using a set of test data, which can be a set of data similar to the training data in that it includes ground truth information, but was not used during the training process. If, at 545, it is determined that the artificial intelligence agent is not sufficiently proficient, process 500 may continue to 510 to further train the machine-learning models of the artificial intelligence agent using additional training datasets. On the other hand, if it is determined that the artificial intelligence agent has reached a desired proficiency level, process 500 may end at 550, representing the end of the training process.

Figure 6:
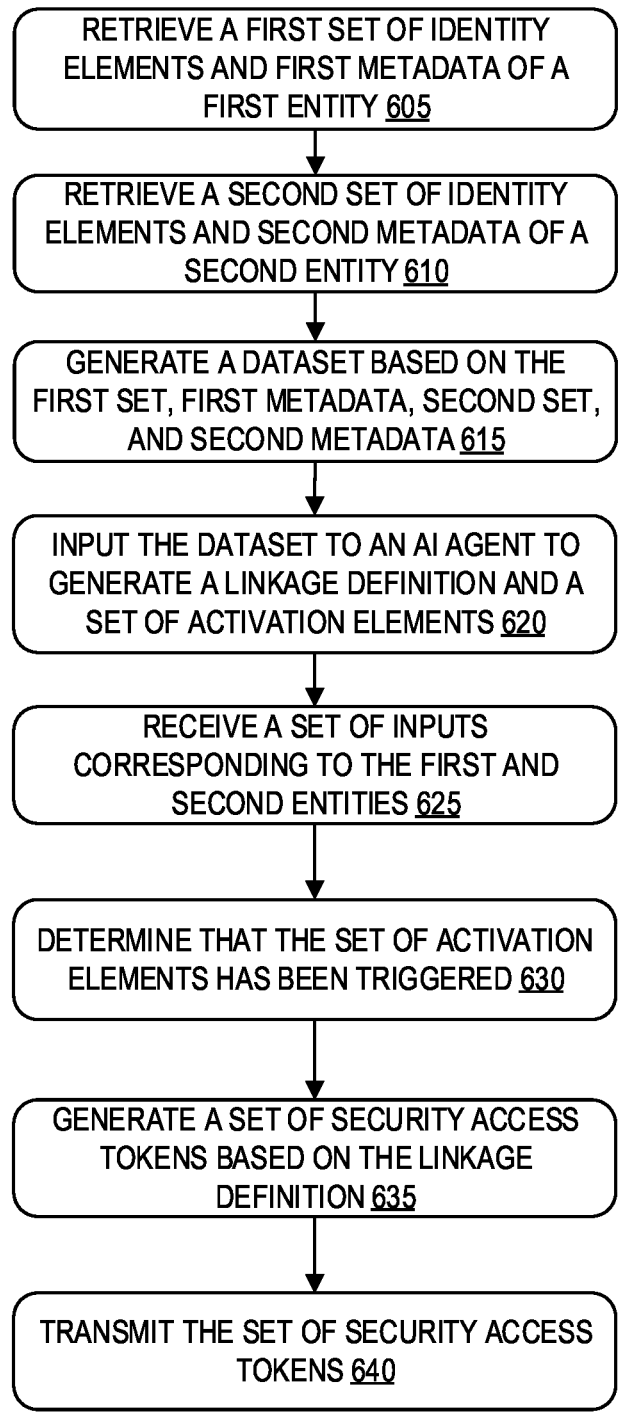
FIG. 6 is a flow diagram of an example method for generating security access tokens, in accordance with one or more example implementations.

Referring to FIG. 6, illustrated is a flow diagram of an example method 600 for generating security access tokens, in accordance with one or more example implementations. The method 600 can be a computer-implemented method. The method 600 may be implemented, for example, using any of the computing systems described herein, such as the primary computing system 404, the user devices 103, or the computing system 700 described in connection with FIG. 7. In some implementations, additional, fewer, or different operations may be performed. It will be appreciated that the order or flow of operations indicated by the flow diagrams and arrows with respect to the methods described herein is not meant to be limiting. For example, in one implementation, two or more of the operations of method 600 may be performed simultaneously, or one or more operations may be performed as an alternative to another operation.

At step 605, the method 600 can include retrieving, from a first primary profile (e.g., a first digital identity profile) associated with a first entity (sometimes referred to herein as a first user), a first set of identity elements (e.g., the identity elements 426) and a first set of metadata corresponding to the first set of identity elements. The identity elements in the first primary profile can include any type of information relating to the first user, including information associated with requests for linkage definitions. In an embodiment, the first identity elements stored in the first primary profile can be identified with corresponding metadata, which may include identifiers of a first computing device of the first use, location data of the first computing device, as well as timestamp information corresponding to when the identity elements were generated by the primary computing system. In an embodiment, the first set of identity elements and the first set of metadata can be received from the first computing device with the first digital identity profile.

For example, the primary computing system may receive the primary profile, and identity elements stored therein, from the first computing device of the first user. Additionally or alternatively, the first primary profile can be received from another computing system that maintains primary profiles for various users. For example, the first set of identity elements and the first set of metadata can be retrieved by transmitting a first API call to another computing system to request the data. In response to the API call, the other computing system can transmit the first primary profile, and the identity elements and metadata stored therein, to the primary computing system.

At step 610, the method 600 can include retrieving, from a second primary profile (e.g., a second digital identity profile) of a second entity (e.g., a second user which is associated with a second computing device), a second set of identity elements (e.g., the identity elements 426) and a second set of metadata corresponding to the second set of identity elements. The identity elements in the second primary profile can include any type of information relating to the second user, including information associated with requests for linkage definitions. In an embodiment, the second identity elements stored in the second primary profile can be identified with corresponding metadata, which may include identifiers of a second computing device of the second use, location data of the second computing device, as well as timestamp information corresponding to when the identity elements were generated by the primary computing system. In an embodiment, the second set of identity elements and the second set of metadata can be received from the second computing device with the second digital identity profile.

For example, the primary computing system may receive the primary profile, and identity elements stored therein, from the second computing device of the second user. Additionally or alternatively, the second primary profile can be received from another computing system that maintains primary profiles for various users. For example, the second set of identity elements and the second set of metadata can be retrieved by transmitting a second API call to another computing system to request the data. In response to the API call, the other computing system can transmit the second primary profile, and the identity elements and metadata stored therein, to the primary computing system.

At step 615, the method 600 can include generating, by the computing system, a dataset based on a plurality of the first set of identity elements, the second set of identity elements, the first set of metadata, and the second set of metadata. The generated dataset can include one or more data structures that are configured to correspond to an input layer of one or more machine-learning models of an artificial intelligence agent (e.g., the artificial intelligence agent 430) of the primary computing system. The data structures can be any suitable data structure, including one or more vectors, matrices, tensors, or other types of data structures that can be provided as input to the artificial intelligence agent. In an embodiment, the dataset can be generated to include a subset of the first and second set of identity elements that correspond to one another or indicate an association between the first user and the second user. The metadata associated with the subset may also be included in the dataset.

At step 620, the method 600 can include inputting the dataset to an artificial intelligence agent (e.g., the artificial intelligence agent 430) to generate a linkage definition (e.g., the linkage definition 428) and a set of activation elements. The artificial intelligence agent having been trained by applying one or more machine learning models to a set of session logs corresponding to digital identity profiles of a cohort of linked entities (e.g., users with previously generated or user-defined linkage definitions). The techniques with which the artificial intelligence agent is trained are described in further detail in connection with FIG. 5.

The session logs can include a multitude of digitally stored online sessions logs generated from use of or interaction with applications (e.g., the client application 418) or other electronic activities performed by users via user devices (e.g., the user devices 103). The session logs may be stored at the primary computing system, for example, in a database. The session logs may contain session information relating to users performing a variety of electronic activities, some of which may identify other users (or other primary profiles of other users). The session logs may include a variety of data that the artificial intelligence agent can gather and analyze that indicate user habits, tendencies, patterns and trends, which may involve other users. For example, the artificial intelligence agent can detect when a user consistently provides a particular authorization credential (e.g., a password, PIN, email, username, etc.) to another user with whom the user is associated. The artificial intelligence agent may determine normal or abnormal customer behavior when simulating customer use of the online software application. To do so, the artificial intelligence agent may execute a pattern recognition model or a classification model to detect the normal or abnormal patterns of behavior. Details relating to the pattern recognition or classification models are described in connection with FIG. 5.

Additional models may also be executed as part of executing the artificial intelligence agent using the dataset as input. For example, the primary computing system can execute one or more regression models to identify causal factors for one or more identity elements or corresponding metadata in the primary profiles of the first user and the second user. The regression models can be executed to detect associations between the first user and the second user, and any corresponding digital assets that may be shared or could be authorized to be shared between the first user and the second user. Some examples of regression techniques that may be executed by the artificial intelligence agent include linear regression models, logistic regression models, SVM techniques, LASSO regression models, polynomial regression models, and other regression tree models. In an embodiment, the artificial intelligence agent can execute a decisioning model to identify actions suited to achieving particular goals based on available options (e.g., whether or not to generate a linkage definition, which activation elements to generate and associate with the linkage definition, etc.). Some examples of decisioning models include risk decisioning models, credit decisioning models, fuzzy decisioning models, or other types of decisioning models.

The linkage definition can identify one or more physical or digital assets of one or both of the first entity or the second entity. The linkage definition can be generated based on an output of the artificial intelligence agent. For example, the artificial intelligence agent can be trained to output an indication of whether the linkage definition should be generated, and if so, which digital assets of the first or second user should be shared with the other of the first or second user. The primary computing system can generate the linkage definition as described herein. The linkage definition can identify the digital assets that are identified based on the output of the artificial intelligence agent. The linkage definition can be a representation indicating that digital assets of the first or second user are to be "linked," or shared, with the other of the first or second user.

The linkage definition can be generated by the primary computing system with one or more activation elements. The activation elements can be a set of conditions under which the digital asset(s) identified in the linkage definition is to be shared with the other user(s). One activation element can be, for example, if the user that is the owner or maintainer of the digital assets becomes deceased. However, it should be understood that any type of condition can be identified as an activation element. The activation elements can be generated or identified by the output of the artificial intelligence agent. Alternatively, one or more of the conditions can also be provided by the first computing device or the second computing device. Some example conditions (sometimes referred to as "states") can include, but are not limited to, particular periods of time, particular geophysical locations (e.g., when the first or second computing devices are located within or outside of a predetermined region), or other types of conditions. The digital assets may be stored at third-party computing systems or at the primary computing system. The digital assets to which the linkage definitions correspond can be, for example, any type of account, profile, or computing resource that is accessible to a computing device via a network (e.g., the network 101), local communication (e.g., wired or local wireless communication), or other types of communication (e.g., user input). The activation elements can be specified by the first or second user as part of the first dataset. After generation, the linkage definition and the set of activation elements can be added to both the first primary profile of the first user and the second primary profile of the second user.

At step 625, the method 600 can include receiving, by the computing system, from a plurality of computing devices, a set of inputs corresponding to the first entity and the second entity (e.g., the first user and the second user, respectively). The plurality of computing devices can include, for example, the first computing device or the second computing device. Additionally or alternatively, the plurality of computing devices can include one or more devices other than the first and second computing devices, or otherwise devices that are not part of the primary computing system, such as third-party devices or other devices of users that are associated with the first user or the second user.

These computing devices can communicate with the primary computing system via a network (e.g., the network 101), and can provide various user input. The user input can be any type of informational input that may relate to the first user or the second user, and may include information that can be used to update the first primary profile of the first user or the second primary profile of the second user. The input can be, for example, data provided by the first computing device, the second computing device, or another computing device that indicates that one or more conditions have been met. The conditions can include, for example, an indication that one or more geophysical locations of at least one of the first computing device or the second computing device are within a predetermined region or area (e.g., one or more of the first user or the second user are on vacation). Any other condition can also be indicated by the user input, including an indication that the first user or the second user is deceased, incapacitated, or unwell, an indication that the current time satisfies a predetermined time period, or any other type of condition. The conditions can correspond to at least one of the set of activation elements of the linkage definition associated with the first primary profile or the second primary profile.

At step 630, the method 600 can include determining, by the computing system, based on the set of inputs, that the set of activation elements has been triggered. The primary computing system can compare the data provided by the set of user inputs to the set of activation elements, to identify if any of the conditions corresponding to the set of activation elements are satisfied. The conditions can include, for example, an indication that one or more geophysical locations of at least one of the first computing device or the second computing device are within a predetermined region or area (e.g., one or more of the first user or the second user are on vacation). Any other condition can also be indicated by the user input, including an indication that the first user or the second user is deceased, incapacitated, or unwell, an indication that the current time satisfies a predetermined time period, or any other type of condition. Upon determining that at least one of the activation elements are satisfied, the primary computing system can proceed to execute step 635 of the method 600. In another embodiment, the set of activation elements can provide that a predetermined group of activation elements (e.g., a predetermined number, a predetermined subset, etc.) must be met before proceeding to execute step 635 of the method 600. In yet another embodiment, all of the set of activation elements must be satisfied to proceed.

At step 635, the method 600 can include, in response to determining that the set of activation elements has been triggered, generating a set of one or more security access tokens based on the linkage definition. The security access tokens can indicate that access to select digital or physical assets are granted for specified time periods (e.g., specified in the first or second primary profile, specified via user input, etc.). The primary computing system can generate the set of access tokens for the digital assets based on the linkage definition. The set of access tokens can be any type of token that can grant access to a secured network location comprising the select digital assets or network links thereto. Additionally, the access tokens may enable access to one or more physical locations (e.g., an access token can be an electronic key for an electronic lock, etc.). The access tokens can be encoded values that are generated, for example, using a hashing algorithm or an encryption algorithm with random or predetermined data as input. The access tokens can be surrogate values that authorize access to a secured network location or to a physical location. The secured network location may be a remote server, a network subdomain, or a cloud computing system that stores the digital assets of the first or second user.

The access tokens (e.g., the surrogate values) may be provided to the secured network location in a request for the digital assets, and the secured network location can verify or authenticate the access tokens using a verification process (e.g., comparing the access tokens to corresponding tokens stored at a secure network location), and can provide access to the digital assets if the verification process is successful. Similar operations can be performed for physical locations, where the device securing the physical location verifies (or communicates with another computing system to verify) the access tokens.

The access tokens can be generated using any suitable tokenization technique, including hashing a unique value, for example, a timestamp of one or more request(s) concatenated with an identifier of the first and second primary profiles (and in some implementations, further concatenated with an additional salt value). In an embodiment, the access tokens can be generated by transmitting a request to the secure network location, which can generate the tokens and can provide the tokens to the primary computing system, while storing a local copy for verification. In another embodiment, the primary computing system can provide the access tokens to the secure network location for verification.

In an embodiment, the primary computing system can transmit a notification to the computing device of the grantee (e.g., the user granted access to the digital assets upon the activation elements being satisfied) that indicates the activation elements have been satisfied. In this example, the computing device of the grantee is the first computing device; however, in another embodiment, the computing device of the grantee can be the second computing device. Upon generation, the set of security access tokens can be added to at least one of the first digital identity profile or the second digital identity profile. The secure network location to which the access tokens grant access can store or include one or more digital files. Additionally, the secure access tokens may unlock or otherwise grant access to one or more smart devices, such as computing devices, laptops, smartphones, internet-of-things (IoT) devices, or other types of electronic devices. In an embodiment, the access tokens can unlock one or more smart containers, which may operate using an electronic lock. The smart containers can be used to secure one or more articles of manufacture, access to which is granted by the access tokens.

At step 640, the method 600 can include transmitting the set of security access tokens to at least one of the first computing device of the first user identified in the first identity profile or the second computing device of the second user identified in the second primary profile. The primary computing system can transmit the access tokens to the first or second computing devices upon generating the security tokens. In an embodiment where the primary computing system stores or maintains the digital assets, the primary computing system can transmit the select digital assets or a subset thereof to the first or second computing device. The first or second computing device can utilize the access tokens to access the digital or physical assets.

C. Computing and Network Environment

Figure 7:
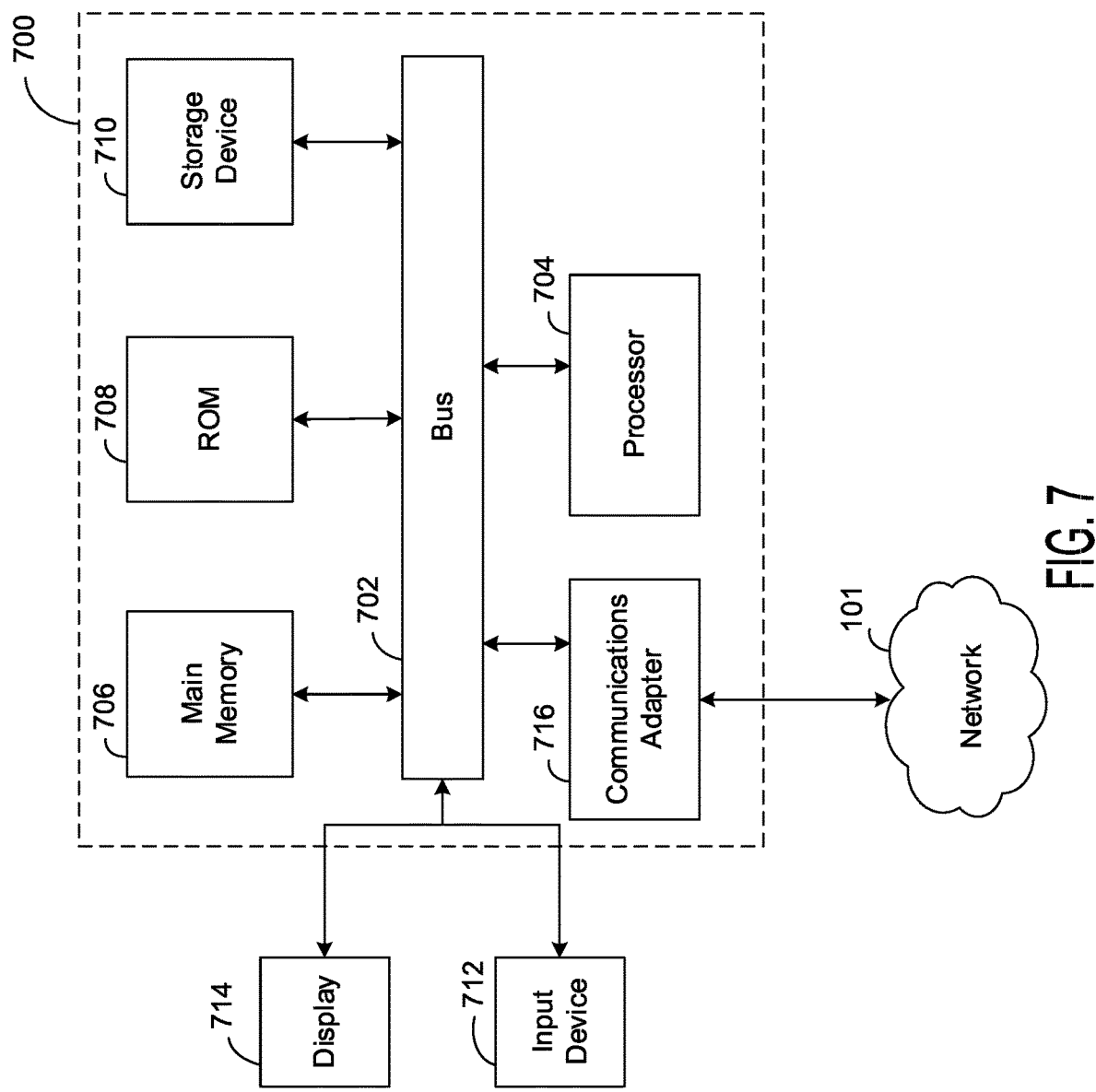
FIG. 7 is a component diagram of an example computing system suitable for use in the various arrangements described herein, in accordance with one or more example implementations.

FIG. 7 is a component diagram of an example computing system suitable for use in the various implementations described herein, according to an example implementation. For example, the computing system 700 may implement an example user device 103A, user device 103B, or primary computing system 104 of FIG. 1, or an example user device 403A, user device 403B, or primary computing system 404 of FIG. 4, or various other example systems and devices described in the present disclosure.

The computing system 700 includes a bus 702 or other communication component for communicating information and a processor 704 coupled to the bus 702 for processing information. The computing system 700 also includes main memory 706, such as a RAM or other dynamic storage device, coupled to the bus 702 for storing information, and instructions to be executed by the processor 704. Main memory 706 can also be used for storing position information, temporary variables, or other intermediate information during execution of instructions by the processor 704. The computing system 700 may further include a read only memory (ROM) 708 or other static storage device coupled to the bus 702 for storing static information and instructions for the processor 704. A storage device 710, such as a solid-state device, magnetic disk, or optical disk, is coupled to the bus 702 for persistently storing information and instructions.

The computing system 700 may be coupled via the bus 702 to a display 714, such as a liquid crystal display, or active matrix display, for displaying information to a user. An input device 712, such as a keyboard including alphanumeric and other keys, may be coupled to the bus 702 for communicating information, and command selections to the processor 704. In another implementation, the input device 712 has a touch screen display. The input device 712 can include any type of biometric sensor, or a cursor control, such as a mouse, a trackball, or cursor direction keys, for communicating direction information and command selections to the processor 704 and for controlling cursor movement on the display 714.

In some implementations, the computing system 700 may include a communications adapter 716, such as a networking adapter. Communications adapter 716 may be coupled to bus 702 and may be configured to enable communications with a computing or communications network 101 and/or other computing systems. In various illustrative implementations, any type of networking configuration may be achieved using communications adapter 716, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 700 in response to the processor 704 executing an implementation of instructions contained in main memory 706. Such instructions can be read into main memory 706 from another computer-readable medium, such as the storage device 710. Execution of the implementation of instructions contained in main memory 706 causes the computing system 700 to perform the illustrative processes described herein. One or more processors in a multi-processing implementation may also be employed to execute the instructions contained in main memory 706. In alternative implementations, hard-wired circuitry may be used in place of or in combination with software instructions to implement illustrative implementations. Thus, implementations are not limited to any specific combination of hardware circuitry and software.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more general-purpose processors, ASICs, FPGAs, digital signal processors (DSPs), or other suitable electronic data processing components structured to execute instructions provided by memory. The one or more processors may take the form of a single core processor, multi-core processor (e.g., a dual core processor, triple core processor, and/or quad core processor), microprocessor, etc. In some implementations, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data, which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

The invention claimed is:

1. A method comprising:
retrieving, by a computing system comprising one or more processors, from a first digital identity profile of a first entity, a first set of identity elements and a first set of metadata corresponding to the first set of identity elements;
retrieving, by the computing system, from a second digital identity profile of a second entity, a second set of identity elements and a second set of metadata corresponding to the second set of identity elements;
generating, by the computing system, a dataset based on a plurality of the first set of identity elements, the second set of identity elements, the first set of metadata, and the second set of metadata;
inputting, by the computing system, the dataset to an artificial intelligence (AI) agent to generate a linkage definition and a set of activation elements, the AI agent having been trained by applying one or more machine learning models to a set of session logs corresponding to digital identity profiles of a plurality of linked entities, wherein the linkage definition identifies one or more physical or digital assets of one or both of the first entity or the second entity, and wherein the set of activation elements identifies one or more states;
receiving, by the computing system, from a plurality of computing devices, a set of inputs corresponding to the first entity and the second entity;
determining, by the computing system, based on the set of inputs, that the set of activation elements has been triggered;

in response to determining that the set of activation elements has been triggered, generating, by the computing system, a set of one or more security access tokens based on the linkage definition, the set of one or more security access tokens indicating that access to select digital or physical assets are granted for specified time periods; and transmitting, by the computing system, the set of one or more security access tokens to at least one of a first device identified in the first digital identity profile or a second device identified in the second digital identity profile.

2. The method of claim 1, wherein applying the one or more machine learning models comprises applying a pattern recognition model or a classification model to recognize normal or abnormal patterns of behavior.

3. The method of claim 1, wherein applying the one or more machine learning models comprises applying a regression model to identify causal factors for one or more identity elements or corresponding metadata in digital identity profiles.

4. The method of claim 1, wherein applying the one or more machine learning models comprises applying a decisioning model to identify actions suited to achieving particular goals based on available options.

5. The method of claim 1, further comprising adding, by the computing system, the set of one or more security access tokens to at least one of the first digital identity profile or the second digital identity profile.

6. The method of claim 1, wherein the set of one or more security access tokens grants access to one or more digital files.

7. The method of claim 1, wherein the set of one or more security access tokens grants access to one or more smart devices.

8. The method of claim 1, wherein the set of one or more security access tokens grants access to one or more physical locations.

9. The method of claim 1, wherein the set of one or more security access tokens grants access to one or more articles of manufacture.

10. The method of claim 1, wherein the first set of identity elements and the first set of metadata are received from a first computing system with the first digital identity profile, and the second set of identity elements and the second set of metadata are received from a second computing system with the second digital identity profile.

11. The method of claim 10, wherein retrieving the first set of identity elements and the first set of metadata comprises transmitting a first application programming interface (API) call to the first computing system, and retrieving the second set of identity elements and the second set of metadata comprises transmitting a second API call to the second computing system.

12. The method of claim 1, wherein the first digital identity profile and the second digital identity profile are maintained by the computing system.

13. The method of claim 1, wherein the one or more states are based on one or more geophysical locations of at least one of the first device or the second device.

14. The method of claim 1, wherein the plurality of computing devices comprises the first device and the second device.

15. The method of claim 1, wherein the plurality of computing devices comprises one or more devices other than the first device and the second device.

16. The method of claim 1, further comprising adding, by the computing system, the linkage definition and the set of activation elements to both the first digital identity profile and the second digital identity profile.

17. A computing system comprising one or more hardware processors coupled to a non-transitory memory, the computing system configured to:

retrieve, from a first digital identity profile of a first entity, a first set of identity elements and a first set of metadata corresponding to the first set of identity elements;

retrieve, from a second digital identity profile of a second entity, a second set of identity elements and a second set of metadata corresponding to the second set of identity elements;

generate a dataset based on a plurality of the first set of identity elements, the second set of identity elements, the first set of metadata, and the second set of metadata;

input the dataset to an artificial intelligence (AI) agent to generate a linkage definition and a set of activation elements, the AI agent having been trained by applying one or more machine learning models to a set of session logs corresponding to digital identity profiles of a plurality of linked entities, wherein the linkage definition identifies one or more physical or digital assets of one or both of the first entity or the second entity, and wherein the set of activation elements identifies one or more states;

receive, from a plurality of computing devices, a set of inputs corresponding to the first entity and the second entity;

determine, based on the set of inputs, that the set of activation elements has been triggered;

in response to determining that the set of activation elements has been triggered, generate a set of one or more security access tokens based on the linkage definition; and transmit the set of one or more security access tokens to at least one of a first device identified in the first digital identity profile or a second device identified in the second digital identity profile to grant access to select digital or physical assets for specified time periods.

18. The computing system of claim 17, wherein applying the one or more machine learning models comprises applying at least one of:

a pattern recognition model or a classification model to recognize normal or abnormal patterns of behavior;

a regression model to identify causal factors for one or more identity elements or corresponding metadata in digital identity profiles; or a decisioning model to identify actions suited to achieving particular goals based on available options.

19. The computing system of claim 17, wherein the set of one or more security access tokens grants access to at least one of a digital file, a smart device, a physical location, or an article of manufacture.

20. The computing system of claim 17, wherein the first set of identity elements and the first set of metadata are received from a first computing system with the first digital identity profile, wherein the second set of identity elements and the second set of metadata are received from a second computing system with the second digital identity profile, wherein retrieving the first set of identity elements and the first set of metadata comprises transmitting a first application programming interface (API) call to the first computing system, and wherein retrieving the second set of identity elements and the second set of metadata comprises transmitting a second API call to the second computing system.

\* \* \* \* \*